(12) United States Patent
Kolling et al.

(10) Patent No.: US 11,961,411 B2
(45) Date of Patent: Apr. 16, 2024

(54) MOBILE CLEANING ROBOT HARDWARE RECOMMENDATIONS

(71) Applicant: iRobot Corporation, Bedford, MA (US)

(72) Inventors: Andreas Kolling, Pasadena, CA (US); Christopher Mehegan, Waltham, MA (US)

(73) Assignee: iRobot Corporation, Bedford, MA (US)

( * ) Notice: Subject to any disclaimer, the term of this patent is extended or adjusted under 35 U.S.C. 154(b) by 29 days.

(21) Appl. No.: 17/881,900

(22) Filed: Aug. 5, 2022

(65) Prior Publication Data

US 2023/0029426 A1   Jan. 26, 2023

Related U.S. Application Data

(63) Continuation of application No. 16/805,274, filed on Feb. 28, 2020, now Pat. No. 11,436,940.

(51) Int. Cl.
*G09B 19/00* (2006.01)
*A47L 9/00* (2006.01)
*A47L 9/04* (2006.01)
*A47L 9/28* (2006.01)
*G09B 5/02* (2006.01)

(52) U.S. Cl.
CPC ............. *G09B 19/00* (2013.01); *A47L 9/009* (2013.01); *A47L 9/0477* (2013.01); *A47L 9/281* (2013.01); *A47L 9/2826* (2013.01); *G09B 5/02* (2013.01); *A47L 2201/06* (2013.01)

(58) Field of Classification Search
CPC .................................................. A47L 2201/06
See application file for complete search history.

(56) References Cited

U.S. PATENT DOCUMENTS

| 11,436,940 B2 | 9/2022 | Kolling et al. |
| 2005/0166354 A1 | 8/2005 | Uehigashi |
| 2016/0128532 A1 | 5/2016 | Babenhauserheide et al. |
| 2019/0025850 A1 | 1/2019 | Park et al. |
| 2021/0272471 A1 | 9/2021 | Kolling et al. |

FOREIGN PATENT DOCUMENTS

| CN | 102551591 | 7/2012 |
| CN | 108852170 | 11/2018 |
| CN | 115175599 | 10/2022 |

(Continued)

OTHER PUBLICATIONS

"Japanese Application Serial No. 2022-549187, Notification of Reasons for Refusal dated May 8, 2023", w English translation, 6 pgs.

(Continued)

*Primary Examiner* — Andrew A Horton
(74) *Attorney, Agent, or Firm* — Schwegman Lundberg & Woessner, P.A.

(57) ABSTRACT

A method of assisting user-configuration of hardware for a mobile autonomous cleaning robot can include detecting a flooring type of a room or other portion of an environment. A size of the portion of the environment can be detected and a total size of the environment can be determined. generating a hardware characteristic recommendation can be generated based at least in part on the flooring type, the size of the portion of the environment, and the total size of the environment.

28 Claims, 12 Drawing Sheets

(56) References Cited

FOREIGN PATENT DOCUMENTS

| | | |
|---|---|---|
| CN | 115175599 | 8/2023 |
| DE | 102016108460 | 11/2017 |
| EP | 3042599 | 7/2016 |
| JP | 2005211364 | 8/2005 |
| JP | 2016201095 | 12/2016 |
| JP | 2018122092 | 8/2018 |
| JP | 7399547 B2 | 12/2023 |
| KR | 20090119638 | 11/2009 |
| WO | 2016096046 | 6/2016 |
| WO | 2021173181 | 9/2021 |

OTHER PUBLICATIONS

"Chinese Application Serial No. 202080097669.0, Office Action dated Apr. 13, 2023", W Concise Statement of Relevance, 6 pgs.

"Japanese Application Serial No. 2022-549187, Response filed Apr. 13, 2023 to Notification of Reasons for Refusal dated Feb. 6, 2023", w English claims, 10 pgs.

"European Application Serial No. 20757058.1, Response filed Apr. 11, 2023 to Communication pursuant to Rules 161(2) and 162 EPC", 15 pgs.

"Japanese Application Serial No. 2022-549187, Notification of Reasons for Refusal dated Feb. 6, 2023", w English Translation, 6 pgs.

"International Application Serial No. PCT US2020 043689, International Search Report dated Nov. 13, 2020", 4 pgs.

"International Application Serial No. PCT US2020 043689, Written Opinion dated Nov. 13, 2020", 7 pgs.

"U.S. Appl. No. 16/805,274, Notice of Allowance dated Jul. 12, 2022", 6 pgs.

"International Application Serial No. PCT US2020 043689, International Preliminary Report on Patentability dated Sep. 9, 2022", 9 pgs.

"Chinese Application Serial No. 202080097669.0, Office Action dated Apr. 13, 2023", w english claims, 37 pages.

"Japanese Application Serial No. 2022-549187, Notification of Reasons for Refusal dated May 8, 2023", w english claims, 10 pgs.

MOBILE CLEANING ROBOT HARDWARE RECOMMENDATIONS

PRIORITY APPLICATIONS

This application is a continuation of U.S. patent application Ser. No. 16/805,274, filed Feb. 28, 2020, the content of which is incorporated herein by reference in its entirety.

BACKGROUND

Autonomous mobile cleaning robots can traverse floor surfaces to perform various operations in an environment, such as vacuuming of one or more rooms of the environment. A cleaning robot can include a controller configured to autonomously navigate the robot about an environment such that the robot can ingest debris as it moves. As an autonomous mobile robot traverses a floor surface, the robot can produce a map of the environment and can produce and record information about the environment. The autonomous mobile cleaning robot can use the map to perform various functions required for cleaning, such as navigation within the environment.

SUMMARY

Autonomous mobile cleaning robots can be useful to automatically or autonomously clean a portion, such as a room or rooms, of an environment, but environments can vary significantly in their makeup of cleaning surfaces and obstacles. For example, some environments can include a combination of hard surfaces (such as wood or ceramic) and softer surfaces (such as carpet). Some environments can have all hard surfaces and some environments can have all carpeted surfaces and many environments have anything in between these extremes.

Because carpet and hard surfaces are dissimilar, cleaning of such surfaces can be tailored in different ways. For example, rollers can help remove debris in relatively longer pile carpeting, but the rollers may not help much to collect debris from a hard surface such as a wood floor. Often, mobile cleaning robots (and most vacuums) are provided with only a single cleaning hardware configuration that is either tailored or optimized for one type of cleaning surface or is more generally sub-optimally configured to be merely adequate at cleaning all types of surfaces, but is not tailored or optimized to either hard or carpeted surfaces. This is because, at least in part, it is difficult to optimize cleaning hardware of a mobile autonomous cleaning robot for an environment without knowing the details of the environment.

This disclosure describes examples of approaches that can help to address this problem such as by analyzing an environment of the robot after purchase and use of the robot in the environment. The robot can use one or more maps created by the robot or other data produced by sensors of the robot such as the type of surfaces within an environment to make a hardware recommendation to a user. For example, the robot can use the maps or data from the environment such as the quantity (or percentage or another relative amount) of each surface to generate a roller recommendation that can be transmitted to a user device. Through the device, the user can be provided an opportunity to replace the rollers of the robot for improved or more efficient cleaning operations within the environment. The robot (or system connected thereto) can generate and transmit one or more other hardware recommendations such as a caster, cage, drive wheel, or side brush recommendation, such as to improve cleaning efficiency of the robot within the user's environment.

The above discussion is intended to provide an overview of subject matter of the present patent application. It is not intended to provide an exclusive or exhaustive explanation of the invention. The description below is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
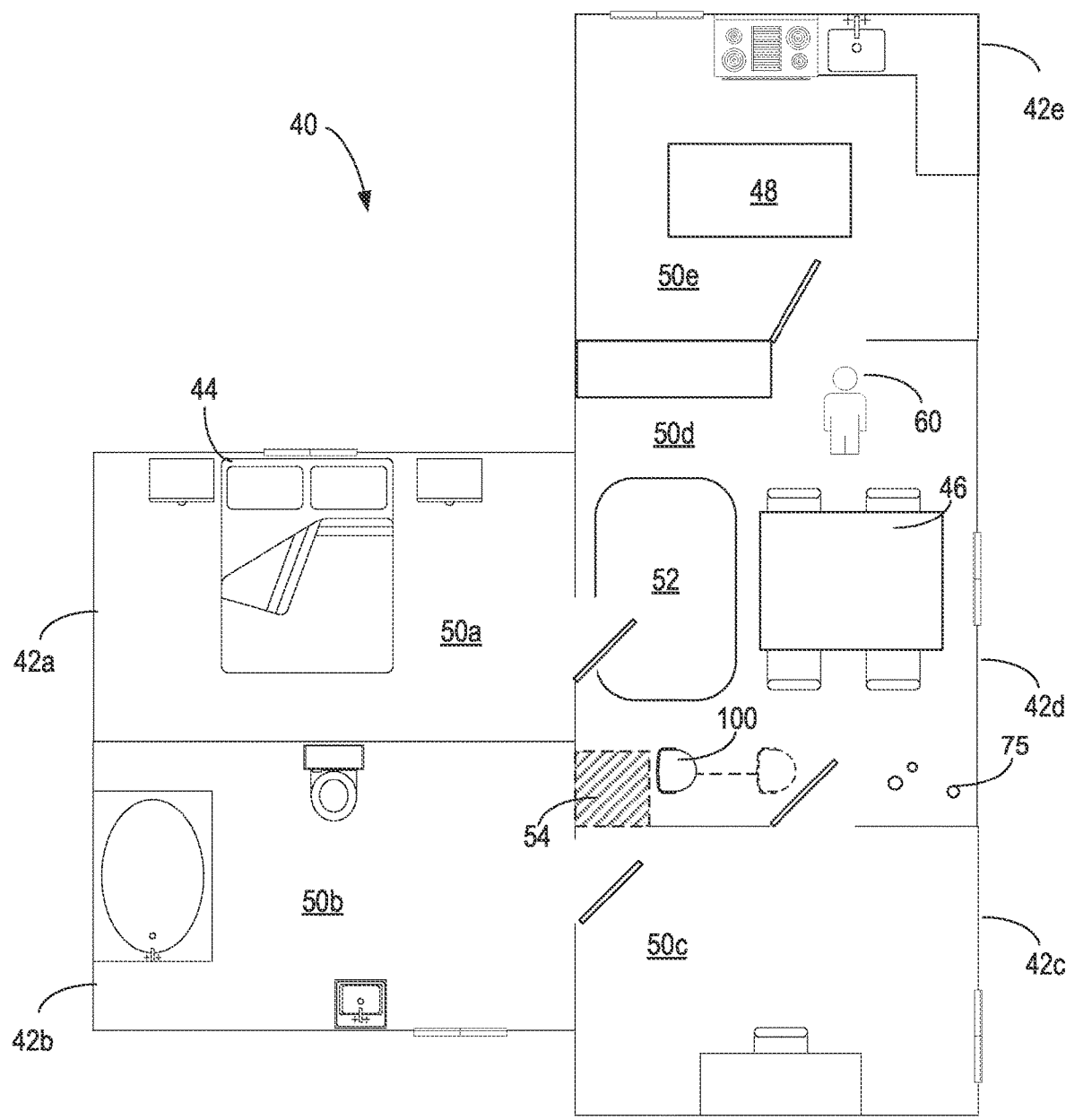
FIG. 1 illustrates a plan view of a mobile cleaning robot in an environment.

FIG. 1 illustrates a plan view of a mobile cleaning robot 100 in an environment 40, in accordance with at least one example of this disclosure. The environment 40 can be a dwelling, such as a home or an apartment, and can include rooms 42a-42e. Obstacles, such as a bed 44, a table 46, and an island 48 can be located in the rooms 42 of the environment. Each of the rooms 42a-42e can have a floor surface 50a-50e, respectively. Some rooms, such as the room 42d, can include a rug, such as a rug 52. The floor surfaces 50 can be of one or more types such as hardwood, ceramic, low-pile carpet, medium-pile carpet, long (or high)-pile carpet, stone, or the like.

The mobile cleaning robot 100 can be operated, such as by a user 60, to autonomously clean the environment 40 in a room-by-room fashion. In some examples, the robot 100 can clean the floor surface 50a of one room, such as the room 42a, before moving to the next room, such as the room 42d, to clean the surface of the room 42d, Different rooms can have different types of floor surfaces. For example, the room 42e (which can be a kitchen) can have a hard floor surface, such as wood or ceramic tile, and the room 50a (which can be a bedroom) can have a carpet surface, such as a medium pile carpet. Other rooms, such as the room 42d (which can be a dining room) can include multiple surfaces where the rug 52 is located within the room 42d.

During cleaning or traveling operations, the robot 100 can use data collected from various sensors (such as optical sensors) and calculations (such as odometry and obstacle detection) to develop a map of the environment 40. Once the map is created, the user 60 can define rooms or zones (such as the rooms 42) within the map. The map can be presentable to the user 60 on a user interface, such as a mobile device, where the user 60 can direct or change cleaning preferences, for example.

Also, during operation, the robot 100 can detect surface types within each of the rooms 42, which can be stored in the robot or another device. The robot 100 can update the map (or data related thereto) such as to include or account for surface types of the floor surfaces 50a-50e of each of the respective rooms 42 of the environment. In some examples, the map can be updated to show the different surface types such as within each of the rooms 42.

In some examples, the user 60 can define a behavior control zone 54 using, for example, the methods and systems described herein. In response to the user 60 defining the behavior control zone 54, the robot 100 can move toward the behavior control zone 54 to confirm the selection. After confirmation, autonomous operation of the robot 100 can be initiated. In autonomous operation, the robot 100 can initiate a behavior in response to being in or near the behavior control zone 54. For example, the user 60 can define an area of the environment 20 that is prone to becoming dirty to be the behavior control zone 54. In response, the robot 100 can initiate a focused cleaning behavior in which the robot 100 performs a focused cleaning of a portion of the floor surface 50d in the behavior control zone 54.

Figure 2A:
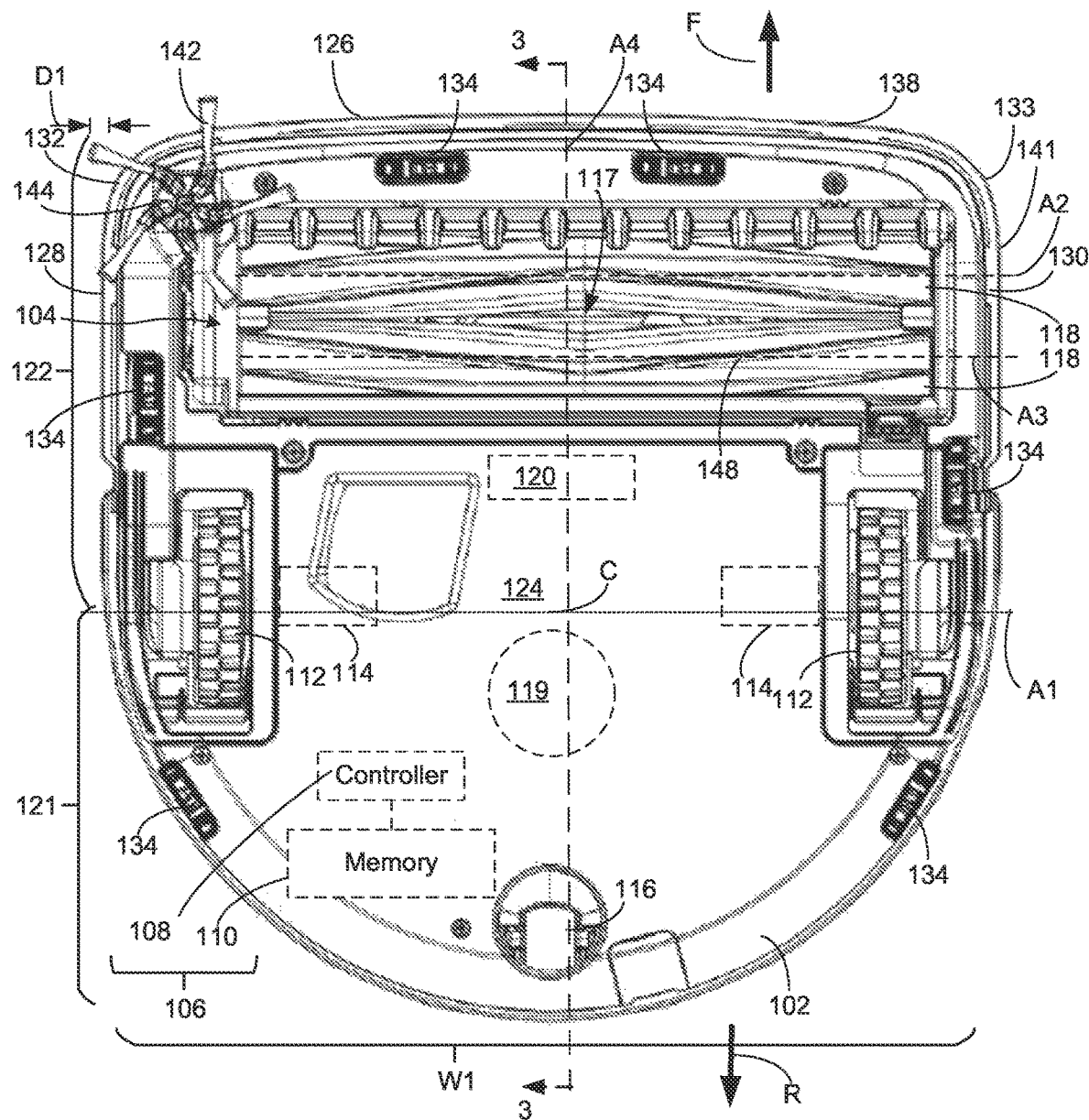
FIG. 2A illustrates a bottom view of a mobile cleaning robot.
Figure 2B:
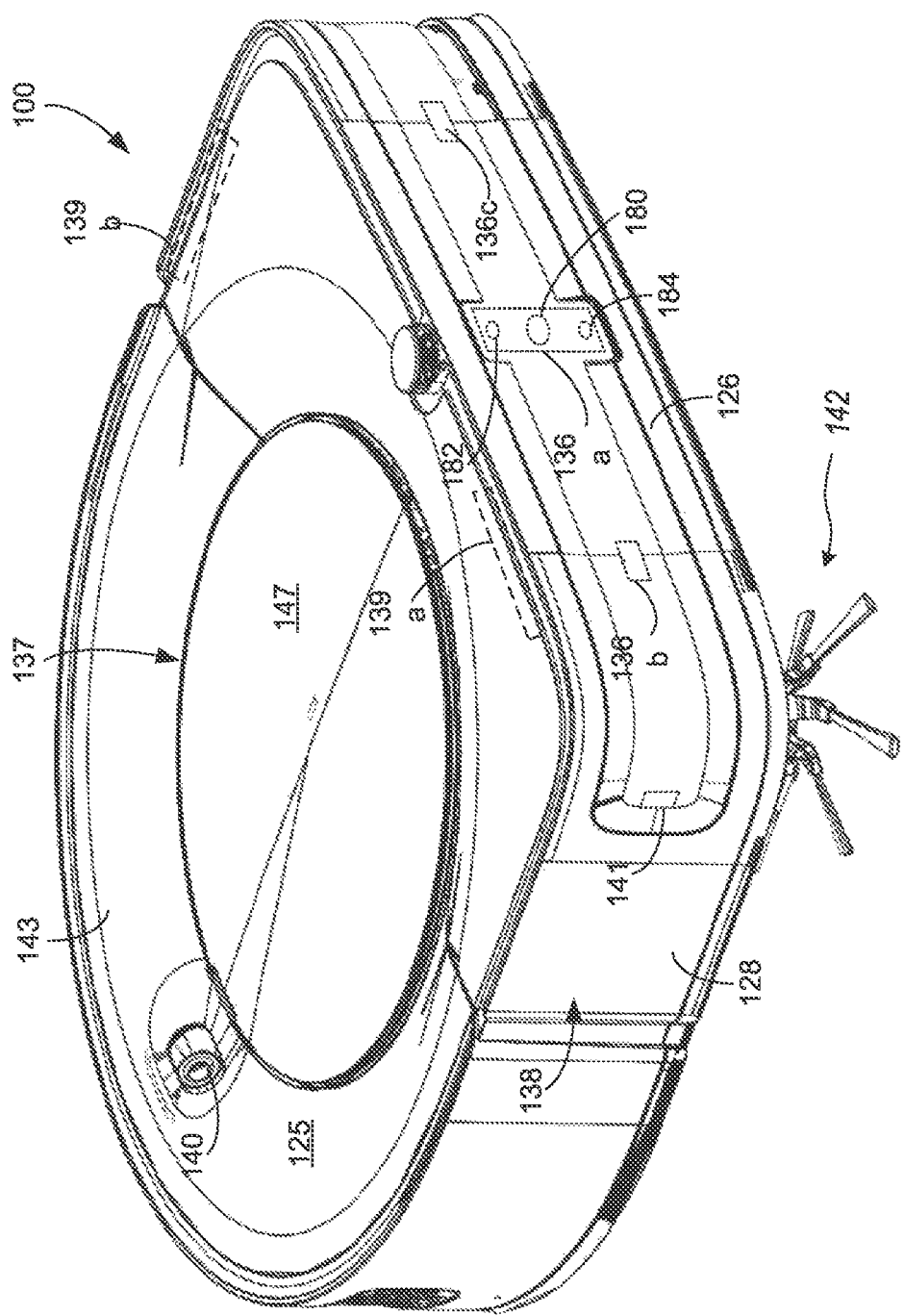
FIG. 2B illustrates a bottom view of a mobile cleaning robot.
Figure 3:
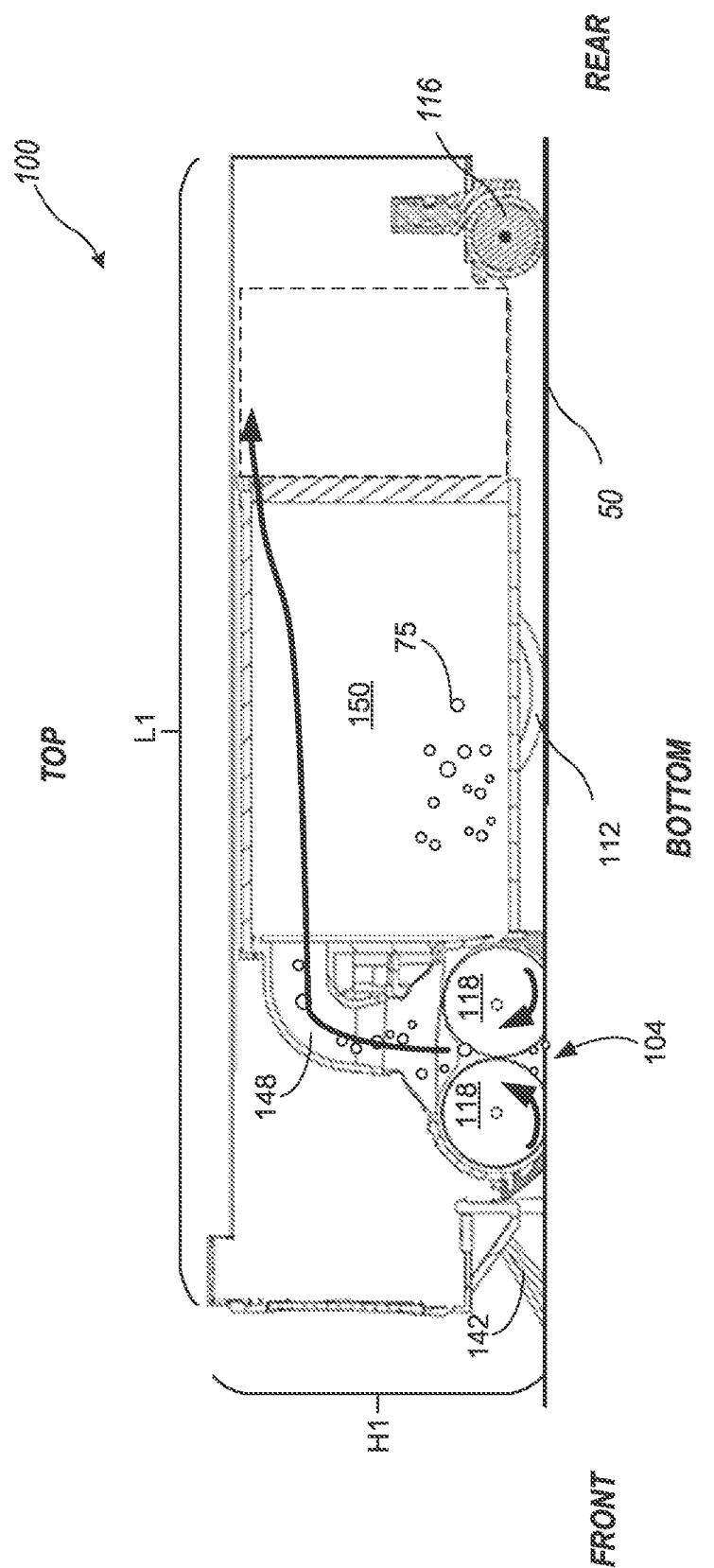
FIG. 3 illustrates a cross-section view across indicators 3-3 of FIG. 2 of a mobile cleaning robot.

FIG. 2A illustrates a bottom view of the mobile cleaning robot 100. FIG. 2B illustrates a bottom view of the mobile cleaning robot 100. FIG. 3 illustrates a cross-section view across indicators 3-3 of FIG. 2 of the mobile cleaning robot 100. FIG. 2A also shows directional arrows F and R and section indicators 3-3, axes A1, A2, A3, and A4, and a center C. FIG. 3 also shows orientation indicators Bottom, Top, Front, and Rear. FIGS. 2A-3 are discussed below concurrently.

Components of the Robot

The cleaning robot 100 can include a housing 102, a cleaning assembly 104, a control system 106 (which can include a controller 108 and memory 110). The cleaning robot 100 can also include drive wheels 112, motor(s) 114, and a caster wheel 116. The cleaning assembly 104 can include a cleaning inlet 117 and rollers or other rotatable members 118, a vacuum system 119, and roller motors 120. The robot 100 can also include a rearward portion 121, a forward portion 122, a bottom portion 124, a top portion 125, a forward surface 126, and side surfaces 128, and 130. The forward portion 122 can include corner surfaces 132 and 133. The robot can further include cliff sensors 134, proximity sensors 136a, 136b, and 136c, a light indicator system 137, a bumper 138, bump sensors 139, an image capture device 140, an obstacle following sensor 141, and a brush 142 (or the side brush 142) including a motor 144.

The housing 102 can be a rigid or semi-rigid structure comprised of materials such as one or more of metals, plastics, foams, elastomers, ceramics, composites, combinations thereof, or the like. The housing 102 can be configured to support various components of the robot 100, such as the wheels 112, the controller 108, the cleaning assembly 104, and the side brush 142. The housing 102 can define the structural periphery of the robot 100. In some examples, the housing 102 includes a chassis, cover, bottom plate, and bumper assembly. Because the robot 100 can be a household robot, the robot 100 can have a small profile so that the robot 100 can fit under furniture within a home. For example, a height H1 (shown in FIG. 3) of the robot 100 relative to the floor surface 50 can be, for example, 13 centimeters or less. The robot 100 can also compact where an overall length L1 (shown in FIG. 3) of the robot 100 and an overall width W1 (shown in FIG. 2) can each be between 30 and 60 centimeters, e.g., between 30 and 40 centimeters, 40 and 50 centimeters, or 50 and 60 centimeters.

The housing 102 can define the forward portion 122 that can be substantially rectangular, and a rearward portion 121 that can be substantially semicircular. In other examples, the forward portion 122 and the rearward portions 122 can be of other shapes or the same shape. The forward portion 122 can include the side surfaces 128 and 130 and the forward surface 126, which can be connected by the corner surfaces 132, 133, respectively. The housing 102 can further define the bottom portion 124, which can define a bottom enclosure of the housing, and can further define the top portion 125, which can define a top enclosure of the housing.

The rotatable members 118 (or rollers 118) of the cleaning assembly 104 can be rotatably connected to the housing 102 near the cleaning inlet 117 (optionally located in the forward portion 122), where the rollers 118 can extend horizontally across the forward portion 122 of the robot 100. The rollers 118 can be positioned along the forward portion 122 of the housing 102, and can extend along 50% to 95% of a width of the forward portion 122 of the housing 102. The cleaning inlet 117 can be positioned between the rotatable members 118.

The rollers 118 can be connected to the roller motors 120 to be driven to rotate relative to the housing 102 to help collect dirt and debris from the environment 40 through the cleaning inlet 117. The cleaning inlet 117 can be positioned forward of the center C of the robot 100 and along the forward portion 122 of the robot 100 between the side surfaces 128 and 130 of the forward portion 122. The vacuum system 119 can include a fan or impeller and a motor operable by the controller 108 to control the fan to generate airflow through the cleaning inlet 117 between the rotatable members 118 and into the debris bin 150.

The rollers 118 can be of several types, such as when the rollers 118 are optimized based on the environment 40, as discussed further below. The rollers 118 can include bristles or brushes, which can be effective at separating (or agitating) debris within carpet fibers for suction by the robot 100. The rollers 118 can also include vanes or flexible members extending therefrom, which can be relatively effective at separating debris within carpet fibers for suction by the robot 100 while also being effective at pulling debris off hard surfaces. The rollers 118 can also include no fins, vanes, or bristles, which can be effective at pulling debris off hard surfaces. The rollers 118 can be other types of rollers in other examples.

The controller 108 can be located within the housing and can be a programable controller, such as a single or multi-board computer, a direct digital controller (DDC), a programable logic controller (PLC), or the like. In other examples the controller 108 can be any computing device, such as a handheld computer, for example, a smart phone, a tablet, a laptop, a desktop computer, or any, other computing device including a processor, memory, and communication capabilities. The memory 110 cam be one or more types of memory, such as volatile or non-volatile memory, read-only memory (ROM), random-access memory (RAM), magnetic disk storage media, optical storage media, flash-memory devices, and other storage devices and media. The memory 110 can be located within the housing 102, connected to the controller 108 and accessible by the controller 108.

The control system 106 can further include a sensor system with one or more electrical sensors, for example. The sensor system, as described herein, can generate a signal indicative of a current location of the robot 100, and can generate signals indicative of locations of the robot 100 as the robot 100 travels along the floor surface 10. The controller 108 can also be configured to execute instructions to perform one or more operations as described herein.

The drive wheels 112 can be supported by the body 102 of the robot 102, can be partially within the housing 102, and can extend through the bottom portion 130 of the housing 102, The wheels 112 can also be connected to and rotatable with a shaft; the wheels 112 can be configured to be driven by the motors 114 to propel the robot 100 along the surface 50 of the environment 40, where the motors 114 can in communication with the controller 108 to control such movement of the robot 100 in the environment 104.

The caster wheel 116 can be connected to the body 102 of the robot and can be either a passive or driven wheel configured to balance and steer the robot 100 within the environment. Together, the drive wheels 112 and the caster wheel 116 can cooperate to support the housing 102 above the floor surface 50. For example, the caster wheel 116 can be located in the rearward portion 121 of the housing infrastructure 102, and the drive wheels 112 can be located forward of the caster wheel 116.

The cliff sensors 134 can be located along the bottom portion 130 of the housing 102. Each of the cliff sensors 134 can be an optical sensor that can be configured to detect a presence or absence of an object below the optical sensor, such as the floor surface 50. The cliff sensors 134 can be connected to the controller 108.

The proximity sensors 136a, 136b, and 136c can be located near the forward surface 126 of the housing 102, In other examples, the proximity sensors 136 can be located on other portions of the housing 102. Each of the proximity sensors 136a, 136b, 136c can include an optical sensor facing outward from the housing 102 and can be configured produce a signal based on a presence or the absence of an object in front of the optical sensor. The proximity sensors 136 can be connected to the controller.

The bumper 138 can be removably secured to the housing 102 and can be movable relative to housing 102 while mounted thereto. In some examples, the bumper 138 form part of the housing 102. For example; the bumper 138 can form the side surfaces 128, 130 as well as the forward surface 126, The bump sensors 139a and 139b (the bump sensors 139) can be connected to the housing 102 and engageable or configured to interact with the bumper 138. The bump sensors 139 can include break beam sensors, capacitive sensors, switches, or other sensors that can detect contact between the robot 100, i.e., the bumper 138, and objects in the environment 40. The bump sensors 139 can be connected to the controller 108.

The image capture device 140 can be a camera connected to the housing 102 and directed toward the top portion 125. The image capture device 140 can be configured to generate a signal based on imagery of the environment 40 of the robot 100 as the robot 100 moves about the floor surface 50.

The obstacle following sensors 141 can include an optical sensor facing outward from the side surface 128 of the housing 102 and that can be configured to detect the presence or the absence of an object adjacent to the side surface 128 of the housing 102. The obstacle following sensor 141 can emit an optical beam horizontally in a direction perpendicular to the forward drive direction F of the robot 100 and perpendicular to the side surface 128 of the robot 100. In some examples, at least some of the proximity sensors 136a, 136b, 136c, and the obstacle following sensor 141 each includes an optical emitter and an optical detector. The optical emitter can emit an optical beam outward from the robot 100, e.g., outward in a horizontal direction, and the optical detector detects a reflection of the optical beam that reflects off an object near the robot 100. The robot 100, e.g., using the controller 108, can determine a time of flight of the optical beam and thereby determine a distance between the optical detector and the object, and hence a distance between the robot 100 and the object.

The brush 142 can be connected to an underside of the robot 100 and can be connected to the motor 144 operable to rotate the side brush 142 with respect to the housing 102 of the robot 100. The side brush 142 can be configured to engage debris to move the debris toward the cleaning assembly 104 or away from edges of the environment 40. The motor 144 configured to drive the side brush 142 can be in communication with the controller 112.

The brush 142 can rotate about a non-horizontal axis, e.g., an axis forming an angle between 75 degrees and 90 degrees with the floor surface 50. The non-horizontal axis, for example, can form an angle between 75 degrees and 90 degrees with the longitudinal axes of the rotatable members 118.

The brush 142 can be a side brush laterally offset from the fore-aft A4 axis A4 of the robot 100 such that the brush 142 can extend beyond an outer perimeter of the housing 102 of the robot 100. For example, the brush 142 can extend beyond one of the side surfaces 128 or 130 of the robot 100 and can thereby be capable of engaging debris on portions (such as a part of a room or an entire room) of the floor surface 50 that the rotatable members 118 typically cannot reach, e.g., portions of the floor surface 50 outside of a portion of the floor surface 50 directly underneath the robot 100.

The brush 142 can also be forwardly offset from an axis A1 of the robot 100 such that the brush 142 also extends beyond the forward surface 126 of the housing 102. As depicted in FIG. 2B, the brush 142 can extend beyond the side surface 128, the corner surface 132 and the forward surface 126 of the housing 102. In some implementations, a horizontal distance D1 that the brush 142 extends beyond the side surface 128 is at least, for example, 0.2 centimeters, e.g., at least 0.25 centimeters, at least 0.3 centimeters, at least 0.4 centimeters, at least 0.5 centimeters, at least 1 centimeter, or more. The brush 142 can be positioned to contact the floor surface 50 during its rotation so that the brush 142 can easily, engage the debris 75 on the floor surface 50.

Operation of the Robot

In operation of some examples, the robot 100 can be propelled in a forward drive direction F or a rearward drive direction R. The robot 100 can also be propelled such that the robot 100 turns in place or turns while moving in the forward drive direction F or the rearward drive direction R.

When the controller 108 causes the robot 100 to perform a mission, the controller 108 can operate the motors 114 to drive the drive wheels 112 and propel the robot 100 along the floor surface 10. In addition, the controller 108 can operate the motor 120 to cause the rollers 118 to rotate, can operate the motor 144 to cause the brush 142 to rotate, and can operate the motor of the vacuum system 119 to generate airflow. The controller 108 can execute software stored on the memory 110 to cause the robot 100 to perform various navigational and cleaning behaviors by operating the various motors of the robot 100.

As shown in FIG. 3, the rollers 118 can counter-rotate relative to one another. For example, the rollers 118 can be rotatable about parallel horizontal axes A2 and A3 (shown in FIG. 2) to contact the floor surface 10 to agitate debris 75 on the floor surface 50 as the rotatable members 118 rotate relative to the housing 102. The rotatable members 118 agitate debris 75 on the floor surface to direct the debris 75 toward the cleaning inlet 117, into the cleaning inlet 117, and into a suction pathway 148 (shown in FIG. 3), and into the debris bin 150 within the robot 100. The vacuum system 119 can cooperate with the cleaning assembly 104 to draw debris 75 from the floor surface 10 into the debris bin 150. In some cases, the airflow generated by the vacuum system 119 can create sufficient force to draw debris 75 on the floor surface 50 upward through the gap between the rotatable members 118 into the debris bin 150.

The brush 142 can be rotatable about the non-horizontal axis in a manner that brushes debris on the floor surface 50 into a cleaning path of the cleaning assembly 104 as the robot 100 moves. For example, in examples in which the robot 100 is moving in the forward drive direction F, the brush 142 is rotatable in a clockwise direction (when viewed from a perspective above the robot 100) such that debris that the brush 142 contacts moves toward the cleaning assembly 104 and toward a portion of the floor surface 50 in front of the cleaning assembly 104 in the forward drive direction F. As a result, as the robot 100 moves in the forward drive direction F, the cleaning inlet 117 of the robot 100 can collect the debris swept by the brush 142. In examples in which the robot 100 is moving in the rearward drive direction R, the brush 142 can be rotatable in a counterclockwise direction (when viewed from a perspective above the robot 100) such that debris that the brush 142 contacts moves toward a portion of the floor surface 50 behind the cleaning assembly 104 in the rearward drive direction R. As a result, as the robot 100 moves in the rearward drive direction R, the cleaning inlet 7 of the robot 100 can collect the debris swept by the brush 142.

The various sensors of the robot 100 can be used to help the robot navigate and clean within the environment 40. For example, the cliff sensors 134 can detect obstacles such as drop-offs and cliffs below portions of the robot 100 where the cliff sensors 134 are disposed. The cliff sensors 134 can transmit signals to the controller 108 so that the controller 108 can redirect the robot 100 based on signals from the cliff sensors 134.

The proximity sensors 136a, 136b, and 136c can produce a signal based on a presence or the absence of an object in front of the optical sensor. For example, detectable objects include obstacles such as furniture, walls, persons, and other objects in the environment 40 of the robot 100. The proximity sensors 136 can transmit signals to the controller 108 so that the controller 108 can redirect the robot 100 based on signals from the proximity sensors 136.

In some examples, the bump sensor 139a can be used to detect movement of the bumper 138 along the fore-aft axis A4 (shown in FIG. 2) of the robot 100. The bump sensor 139b can also be used to detect movement of the bumper 138 along the axis A1 of the robot 100. The bump sensors 139 can transmit signals to the controller 108 so that the controller 108 can redirect the robot 100 based on signals from the bump sensors 139.

The image capture device 140 can be configured to generate a signal based on imagery of the environment 40 of the robot 100 as the robot 100 moves about the floor surface 50. The image capture device 140 can transmit such a signal to the controller 108. The image capture device 140 can be angled in an upward direction, e.g., angled between 30 degrees and 80 degrees from the floor surface 50 about which the robot 100 navigates. The camera 140, when angled upward, can capture images of wall surfaces of the environment so that features corresponding to objects on the wall surfaces can be used for localization.

In some examples, the obstacle following sensors 141 can detect detectable objects, including obstacles such as furniture, walls, persons, and other objects in the environment of the robot 100. In some implementations, the sensor system can include an obstacle following sensor along the side surface 130, and the obstacle following sensor can detect the presence or the absence an object adjacent to the side surface 130. The one or more obstacle following sensors 141 can also serve as obstacle detection sensors, similar to the proximity sensors described herein.

The robot 100 can also include sensors for tracking a distance travelled by the robot 100. For example, the sensor system can include encoders associated with the motors 114 for the drive wheels 112, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The controller 108 can use data collected by the sensors of the sensor system to control navigational behaviors of the robot 100 during the mission. For example, the controller 108 can use the sensor data collected by obstacle detection sensors of the robot 100, (the cliff sensors 134, the proximity sensors 136, and the bump sensors 139) to enable the robot 100 to avoid obstacles within the environment of the robot 100 during the mission.

The sensor data can also be used by the controller 108 for simultaneous localization and mapping (SLAM) techniques in which the controller 108 extracts features of the environment represented by the sensor data and constructs a map of the floor surface 50 of the environment. The sensor data collected by the image capture device 140 can be used for techniques such as vision-based SLAM (VSLAM) in which the controller 108 extracts visual features corresponding to objects in the environment 40 and constructs the map using these visual features. As the controller 108 directs the robot 100 about the floor surface 50 during the mission, the controller 108 can use SLAM techniques to determine a location of the robot 100 within the map by detecting features represented in collected sensor data and comparing the features to previously stored features. The map formed from the sensor data can indicate locations of traversable and nontraversable space within the environment. For example, locations of obstacles can be indicated on the map as nontraversable space, and locations of open floor space can be indicated on the map as traversable space.

The sensor data collected by any of the sensors can be stored in the memory 110. In addition, other data generated for the SLAM techniques, including mapping data forming the map, can be stored in the memory 110. These data produced during the mission can include persistent data that are produced during the mission and that are usable during further missions. In addition to storing the software for causing the robot 100 to perform its behaviors, the memory 110 can store data resulting from processing of the sensor data for access by the controller 108. For example, the map can be a map that is usable and updateable by the controller 108 of the robot 100 from one mission to another mission to navigate the robot 100 about the floor surface 50.

The persistent data, including the persistent map, helps to enable the robot 100 to efficiently clean the floor surface 50. For example, the map enables the controller 108 to direct the robot 100 toward open floor space and to avoid nontraversable space. In addition, for subsequent missions, the controller 108 can use the map to optimize paths taken during the missions to help plan navigation of the robot 100 through the environment 40.

The robot 100 can, in some implementations, include a light indicator system 137 located on the top portion 125 of the robot 100. The light indicator system 137 can include light sources positioned within a lid 147 covering the debris bin 150 (shown in FIG. 213). The light sources can be positioned to direct light to a periphery of the lid 147. The light sources are positioned such that any portion of a continuous loop 146 on the top portion 125 of the robot 100 can be illuminated. The continuous loop 146 is located on a recessed portion of the top portion 125 of the robot 100 such that the light sources can illuminate a surface of the robot 100 as they are activated.

Network Examples

Figure 4A:
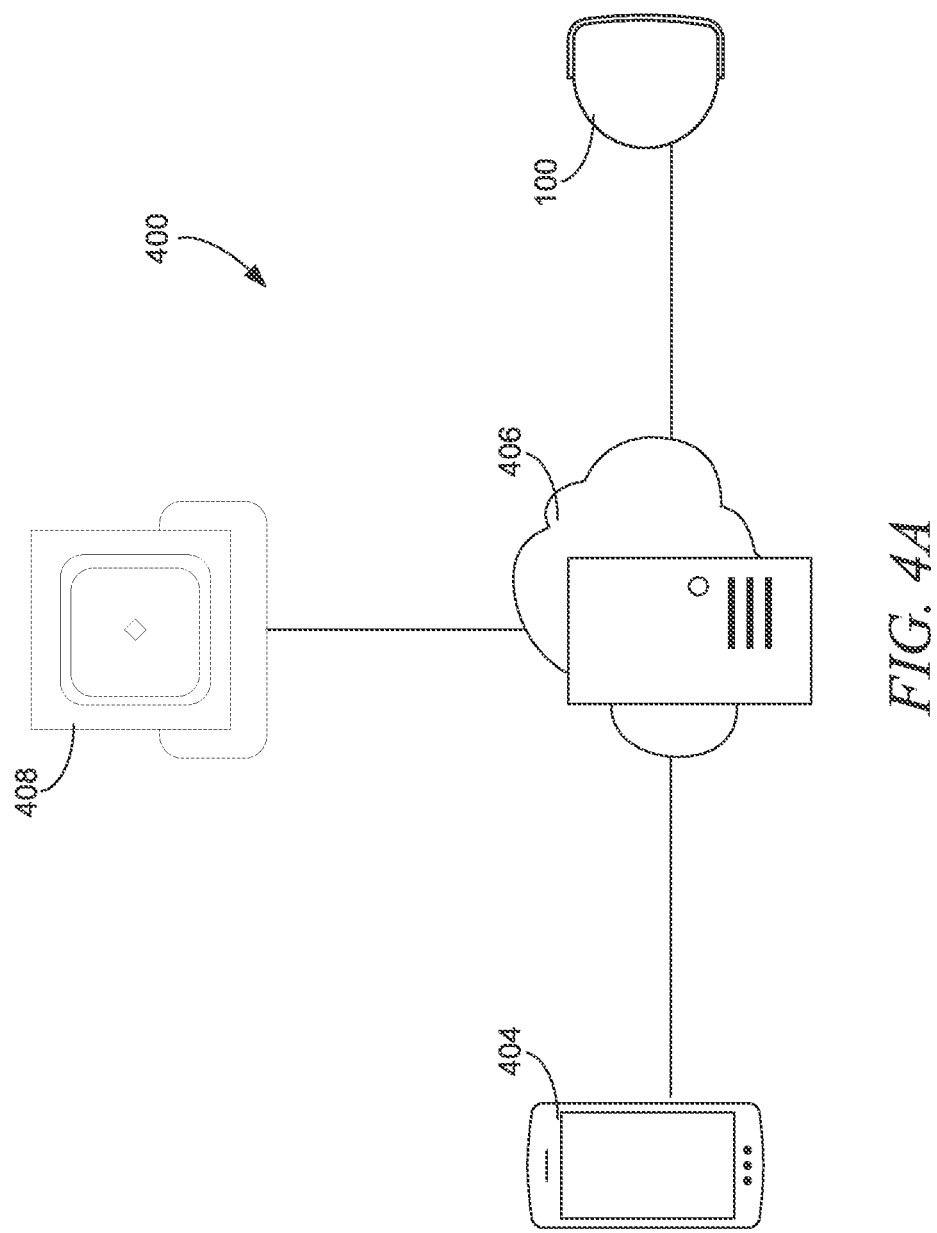
FIG. 4A illustrates a schematic view of a network.

FIG. 4A is a diagram illustrating by way of example and not limitation a communication network 400 that enables networking between the mobile robot 100 and one or more other devices, such as a mobile device 404, a cloud computing system 406, or another autonomous robot 408 separate from the mobile robot 404. Using the communication network 410, the robot 100, the mobile device 404, the robot 408, and the cloud computing system 406 can communicate with one another to transmit and receive data from one another. In some examples, the robot 100, the robot 408, or both the robot 100 and the robot 408 communicate with the mobile device 404 through the cloud computing system 406. Alternatively or additionally, the robot 100, the robot 408, or both the robot 100 and the robot 408 communicate directly with the mobile device 404. Various types and combinations of wireless networks (e.g., Bluetooth, radio frequency, optical based, etc.) and network architectures (e.g., mesh networks) may be employed by the communication network 410.

In some examples, the mobile device 404 can be a remote device that can be linked to the cloud computing system 406 and can enable a user to provide inputs. The mobile device 404 can include user input elements such as, for example, one or more of a touchscreen display, buttons, a microphone, a mouse, a keyboard, or other devices that respond to inputs provided by the user. The mobile device 404 can also include immersive media (e.g., virtual reality) with which the user can interact to provide input. The mobile device 404, in these examples, can be a virtual reality headset or a head-mounted display.

The user can provide inputs corresponding to commands for the mobile robot 404. In such cases, the mobile device 404 can transmit a signal to the cloud computing system 406 to cause the cloud computing system 406 to transmit a command signal to the mobile robot 100. In some implementations, the mobile device 404 can present augmented reality images. In some implementations, the mobile device 404 can be a smart phone, a laptop computer, a tablet computing device, or other mobile device.

According to some examples discussed herein, the mobile device 404 can include a user interface configured to display a map of the robot environment. A robot path, such as that identified by a coverage planner, may also be displayed on the map. The interface may receive a user instruction to modify the environment map, such as by adding, removing, or otherwise modifying a keep-out zone in the environment; adding, removing, or otherwise modifying a focused cleaning zone in the environment (such as an area that requires repeated cleaning); restricting a robot traversal direction or traversal pattern in a portion of the environment; or adding or changing a cleaning rank, among others.

In some examples, the communication network 410 can include additional nodes. For example, nodes of the communication network 410 can include additional robots. Alternatively or additionally, nodes of the communication network 410 can include network-connected devices that can generate information about the environment 20. Such a network-connected device can include one or more sensors, such as an acoustic sensor, an image capture system, or other sensor generating signals, to detect characteristics of the environment 20 from which features can be extracted. Network-connected devices can also include home cameras, smart sensors, or the like.

In the communication network 410, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel, satellite band, or the like. In some examples, wireless links can include any cellular network standards used to communicate among mobile devices, including, but not limited to, standards that qualify as 1G, 2G, 3G, 4G, 5G, or the like. The network standards, if utilized, qualify as, for example, one or more generations of mobile telecommunication standards by fulfilling a specification or standards such as the specifications maintained by International Telecommunication Union. For example, the 4G standards can correspond to the International Mobile Telecommunications Advanced (IMT-Advanced) specification. Examples of cellular network standards include AMPS, GSM, GPRS, UMTS, LIE, LTE Advanced, Mobile WiMAX, and WiMAX-Advanced. Cellular network standards may use various channel access methods, e.g., FDMA, TDMA, CDMA, or SDMA.

Figure 4B:
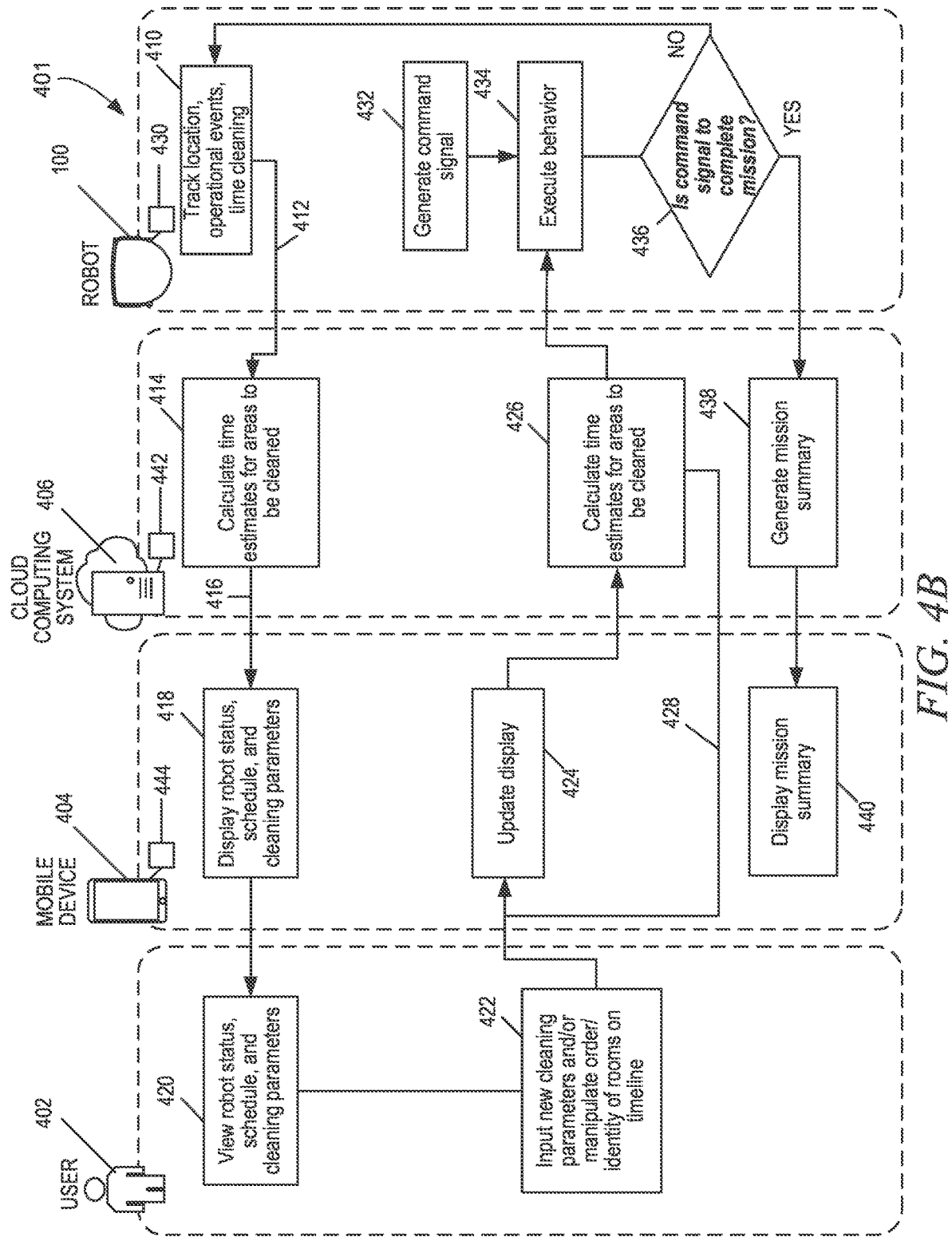
FIG. 4B illustrates a schematic view of a network.

FIG. 4B is a diagram illustrating an exemplary process 401 of exchanging information among devices in the communication network 410, including the mobile robot 100, the cloud computing system 406, and the mobile device 404.

In operation of some examples, a cleaning mission can be initiated by pressing a button on the mobile robot 100 (or the mobile device 404) or can be scheduled for a future time or day. The user can select a set of rooms to be cleaned during the cleaning mission or can instruct the robot to clean all rooms. The user can also select a set of cleaning parameters to be used in each room during the cleaning mission.

During a cleaning mission, the mobile robot 100 can track 410 its status, including its location, any operational events occurring during cleaning, and time spent cleaning. The mobile robot 100 can transmit 412 status data (e.g. one or more of location data, operational event data, time data) to the cloud computing system 406, which can calculate 414, such as by a processor 442, time estimates for areas to be cleaned. For example, a time estimate can be calculated for cleaning a room by averaging the actual cleaning times for the room that have been gathered during one or more prior cleaning mission(s) of the room. The cloud computing system 406 can transmit 416 time estimate data along with robot status data to the mobile device 404. The mobile device 404 can present 418, such as by a processor 444, the robot status data and time estimate data on a display. The robot status data and time estimate data can be presented on the display of the mobile device 404 as any of a number of graphical representations editable mission timeline or a mapping interface.

A user 402 can view 420 the robot status data and time estimate data on the display and can input 422 new cleaning parameters or can manipulate the order or identity of rooms to be cleaned. The user 402 can also delete rooms from a cleaning schedule of the mobile robot 100. In other instances, the user 402 can select an edge cleaning mode or a deep cleaning mode for a room to be cleaned.

The display of the mobile device 404 can be updated 424 as the user changes the cleaning parameters or cleaning schedule. For example, if the user changes the cleaning parameters from single pass cleaning to dual pass cleaning, the system will update the estimated time to provide an estimate based on the new parameters. In this example of single pass cleaning vs. dual pass cleaning, the estimate would be approximately doubled. In another example, if the user removes a room from the cleaning schedule, the total time estimate is decreased by approximately the time needed to clean the removed room. Based on the inputs from the user 402, the cloud computing system 406 can calculate 426 time estimates for areas to be cleaned, which can then be transmitted 428 (e.g. by a wireless transmission, by applying a protocol, by broadcasting a wireless transmission) back to the mobile device 404 and displayed. Additionally, data relating to the calculated 426 time estimates can be transmitted 446 to a controller 430 of the robot. Based on the inputs from the user 402, which are received by the controller 430 of the mobile robot 100, the controller 430 can generate 432 a command signal. The command signal commands the mobile robot 100 to execute 434 a behavior, such as a cleaning behavior. As the cleaning behavior is executed, the controller 430 can continue to track 410 a status of the robot 100, including its location, any operational events occurring during cleaning, or a time spent cleaning. In some instances, live updates relating to a status of the robot 100 can be additionally provided via push notifications to the mobile device 404 or a home electronic system (e.g. an interactive speaker system.

Upon executing 434 a behavior, the controller 430 can check 436 to see if the received command signal includes a command to complete the cleaning mission. If the command signal includes a command to complete the cleaning mission, the robot can be commanded to return to its dock and upon return can transmit information to enable the cloud computing system 406 to generate 438 a mission summary which can be transmitted to, and displayed 440 by, the mobile device 404. The mission summary can include a timeline or a map. The timeline can display, the rooms cleaned, a time spent cleaning each room, operational events tracked in each room, etc. The map can display the rooms cleaned, operational events tracked in each room, a type of cleaning (e.g. sweeping or mopping) performed in each room, etc.

In some examples, communications can occur between the mobile robot 100 and the mobile device 404 directly. For example, the mobile device 404 can be used to transmit one or more instructions through a wireless method of communication, such as Bluetooth or Wi-fi, to instruct the mobile robot 100 to perform a cleaning operation (mission).

Operations for the process 401 and other processes described herein, such one or more steps of the methods 500 and 600 can be executed in a distributed manner. For example, the cloud computing system 406, the mobile robot 100, and the mobile device 404 may execute one or more of the operations in concert with one another. Operations described as executed by one of the cloud computing system 406, the mobile robot 100, and the mobile device 404 are, in some implementations, executed at least in part by two or all of the cloud computing system 406, the mobile robot 100, and the mobile device 404.

Further Operations of the Robot

Figure 5:
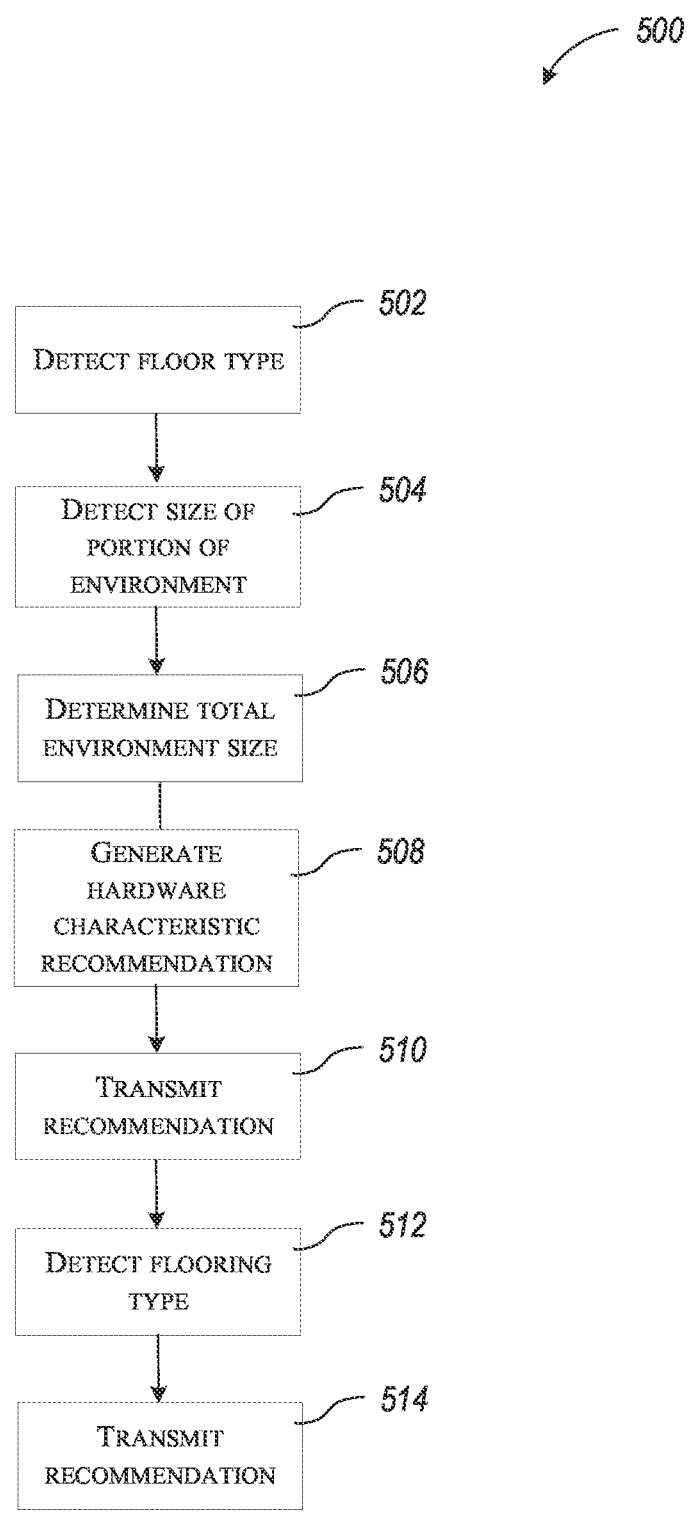
FIG. 5 illustrates a schematic view of a method.

FIG. 5 illustrates a schematic view of the method 500, in accordance with at least one example of this disclosure. The method 500 can be a method of generating a hardware recommendation to a user of an autonomous mobile cleaning robot. The robot 100 can use maps created by the robot 100 or other data produced by sensors of the robot 100, such as the type of any of the surfaces 50 within the environment 40, to make a hardware recommendation to the user 60 utilizing, for example, the network 400 and one or more steps of the process 401.

For example, the robot 100 can use the maps or data from the environment 40 such as the quantity (or percentage) of each surface 50 to generate a roller recommendation that can be transmitted to the user device 404. Through the device 404, the user 60 can be provided an opportunity to replace the rollers of the robot 100 for improved or more efficient cleaning operations within the environment 40. The robot 100 (or system connected thereto) can also generate and transmit other hardware recommendations such as a caster, cage, drive wheel, or side brush recommendation to improve cleaning efficiency of the robot within the user's environment.

More specific examples of the method 500 are discussed below. The steps or operations of the method 500 are illustrated in a particular order for convenience and clarity; many of the discussed operations can be performed in a different sequence or in parallel without materially impacting other operations. The method 500 as discussed includes operations performed by multiple different actors, devices, or systems. It is understood that subsets of the operations discussed in the method 500 can be attributable to a single actor, device, or system could be considered a separate standalone process or method.

The method 500 can begin at step 502 where a flooring type of a portion of an environment can be detected. The flooring type can be detected using one or more methods. The flooring type can be determined using a motor current sensor connected to the drive wheels 112 where the current sensor can transmit a current draw signal to the controller 108 and the controller 108 can detect or determine current required by motors connected to the drive wheels 112 to propel the robot 100. That motor current can be correlated (or otherwise used) to determine a flooring type of the portion of the environment.

The flooring type can also be determined using an optical sensor (such as a light emitting diode). For example, the cliff sensors 134 can emit light toward the surface, which can be reflected and captured by the cliff sensors. The sensors can then transmit an optical sensor signal to the controller 108. The controller 108 can evaluate the reflected signal against a baseline signal characteristic to determine a surface roughness or type.

The flooring type can also be determined through the use of a camera (image capture device). The camera can be used to capture imagery of the environment 40, such as of a surface of a portion (or room) of the environment. The camera can transmit the image to the controller 108 where the controller can analyze the image using one or more algorithms for determining flooring type based on the image.

In some examples, the controller 108 can use a machine learning model to determine the flooring type based on the images capture by the camera.

The flooring type can also be detected or determined for a portion in correspondence with an environment (such as a room or part of a room) For example, a flooring type of the floor surface 50*a*-50*e* of any of the rooms 42*a*-42*e* of the environment 40 can be detected or determined by the robot 100. Then, at step 504, a size of the portion of the environment can be detected. For example, a size, such as a surface area, of any of the rooms 42*a*-42*e* (or any combination of the rooms 42*a*-42*e*) of the environment 40 can be determined by the robot using the controller 108 and inputs from one or more of the sensors. In some examples, the controller 108 can use the map developed by the controller 108 using, for example, SLAM and VSLAM to determine the size of each portion of the environment 40. At step 506, a total size of the environment can be determined. For example, a size, such as a surface area, of all of the rooms 42*a*-42*e* of the environment 40 can be detected or determined by the robot using the controller 108 and inputs from one or more of the sensors or the map developed by the controller using, for example, SLAM and VSLAM At step 508, a roller type recommendation can be generated based at least in part on the flooring type (such as the flooring type of the portion of the environment), the size of the portion of the environment, and the total size of the environment. For example, the controller 108 of the robot 100, the cloud computing system, or the mobile device 404 can generate the roller type recommendation based at least in part on the flooring type of any of the rooms 42 (or any portion of the rooms 42 or group of rooms 42), the size of the rooms (or groups of rooms 42) of the environment 40, and the total size of the environment 40. That is, in some examples, the roller type recommendation can be generated by determining a percentage of each (or some or one) flooring type within the environment 40. For example, it can be determined that the environment 40 contains 95% hard floors (such as wood and ceramic) and 5% carpet or similar surfaces. The controller 108, for example, can then determine that a roller designed for hard flooring surfaces would clean the environment 40 more effectively than the current roller.

Also, the controller 108 of the robot 100, the cloud computing system, or the mobile device 404 can generate the roller type recommendation based at least in part on a type of debris, a quantity of debris, or a density of debris in one room 42 of the environment, or in the environment generally. For example, a roller with a particular vane length can be recommended in an environment with large debris and using no roller can be recommended in an environment with a high percentage of hard surfaces and with a large percentage of fine dust as a debris type.

A characteristic of the floor surface such as roughness, surface finish or carpet density can also be used to make a determination or hardware recommendation. For example, an environment including a high percentage of hard surfaces that are rough (unfinished concrete) may recommend removing rollers or including a roller type that is more resilient.

At step 510, the roller type recommendation can be transmitted to a user interface device. For example, the roller type recommendation can be transmitted from the controller 108 to the mobile device 404 for display on a user interface of the mobile device 404. In other examples, other user device interfaces (such as a television, laptop computer, tablet computer, or desktop computer) can be used to display the recommendation.

Though the method 500 is discussed as producing a roller type recommendation, the method 500 can be used to generate other types of recommendations, such as a caster type, a side brush type, a cage type, or a side brush rotational speed.

For example, the method 500 can be used to generate a hardware characteristic recommendation based at least in part on the flooring type of any room 42 of the environment 40, the size of the room (portion of room or number of rooms) of the environment 40, or the total size of the environment 40. The hardware characteristic recommendation can then be transmitted to the mobile device 404 for display on a user interface of the mobile device 404.

In one example, the hardware characteristic recommendation can be a side brush type recommendation based at least in part on the flooring type indication. That is, the controller 108 (or other system) can recommend that the side brush 142 be replaced with a different side brush, such as a side brush with more or fewer brushes, or the controller 108 can recommend removal of the side brush entirely. In some examples, an optimal length of the side brush 142 can be determined based at least in part on the flooring type indication. For example, if the environment 40 has a high percentage of hard surfaces, a shorter side brush may be more effective than a longer side brush. Further, the side brush can be determined by the controller 108 based on debris density or size. For example, a side brush with additional arms or bristles can be recommended or determined where additional larger and dry debris (such as near a litter box) is detected or otherwise determined.

Similarly, the controller 108 can determine a side brush rotational speed recommendation based at least in part on the flooring type indication. For example, if the environment 40 has a high percentage of hard surfaces, a slower side brush may more effectively pass debris into a path of the cleaning assembly 104 (near the rollers 118) than a faster spinning side brush. Conversely, if the environment 40 has a high percentage of carpeted surfaces, a faster spinning side brush may more effectively pass debris into a path of the cleaning assembly 104 (near the rollers 118). Further, the controller 108 can adjust a speed of the motor 144 to adjust the speed of the side brush 142.

In another example, a cage type recommendation can be produced or determined based at least in part on the flooring type to help improve mobility of the robot 100, cleaning performance of the robot 100, or durability of the robot 100, The cage can be a housing or other portion of the cleaning assembly, such as the structure supporting the rollers. For example, the controller 108 (or other system) can produce a recommendation of a cage with a lower inlet when the environment 40 has predominantly hard surfaces and can recommend a cage with a higher inlet when the environment 40 has predominantly carpet surfaces to help improve cleaning efficiency of the robot 100. Other cages can be recommended, such as cages with larger or smaller openings (in width or length). In an example where the environment 40 has a high quantity of carpet or high-pile carpet, a cage with a higher inlet can be recommended to help improve mobility of the robot 100 through the environment 40. In some examples, the controller 108 can recommend that one or more of the rollers 118 be removed, such as when the environment 40 has entirely, or nearly entirely, hard surfaces.

In another example, the controller, through the autonomous cleaning robot, can detect a mobility obstacle within the environment. For example, the controller 108 can use one or more of the sensors of the robot 100 to determine a presence of an obstacle, such as a large transition threshold between rooms, such as between rooms 42 of the environment 40.

In some examples, the controller can produce a caster type recommendation based at least in part on the flooring type indication and the mobility obstacle. That is, the controller 108, when the controller determines the existence of a mobility obstacle, such as a large transition threshold between rooms, can use the detection of such an obstacle along with the flooring type of the room to produce a recommendation of a different caster type. The different caster types that can be recommended can include variations in size of the caster, variations in a number of wheels of the caster, variations in bearings of the caster, variations in whether the caster is passive or actively drive, or variations in a material (or materials) of the caster, such as to affect compliance of the caster, or the like.

In some examples, the controller can produce a roller type recommendation based at least in part on the flooring type indication and the mobility obstacle. That is, the controller 108, when the controller determines the existence of a mobility obstacle, such as a large transition threshold between rooms, can use the detection of such an obstacle along with the flooring type of the room, to produce a recommendation of a different roller type where the roller includes a mobility feature, such as a nub. Such a feature is shown and described in the U.S. Non-Provisional patent application Ser. No. 16/288,699 to Eric J. Burbank et al., entitled "Cleaning Roller for Autonomous Mobile Robot," filed on Feb. 28, 2019 which is hereby incorporated by reference herein in its entirety.

For example, when a mobility obstacle is detected it can be beneficial to increase a size (such as a diameter) of the caster. It can also be beneficial to increase a compliance of the caster, where the compliance can be changed through the use of a different wheel design (structure) or use of a different wheel material, such as a wheel that is more flexible. Such flexibility can allow a caster to more easily overcome mobility obstacles by maintaining traction along a surface of the obstacle.

Figure 6:
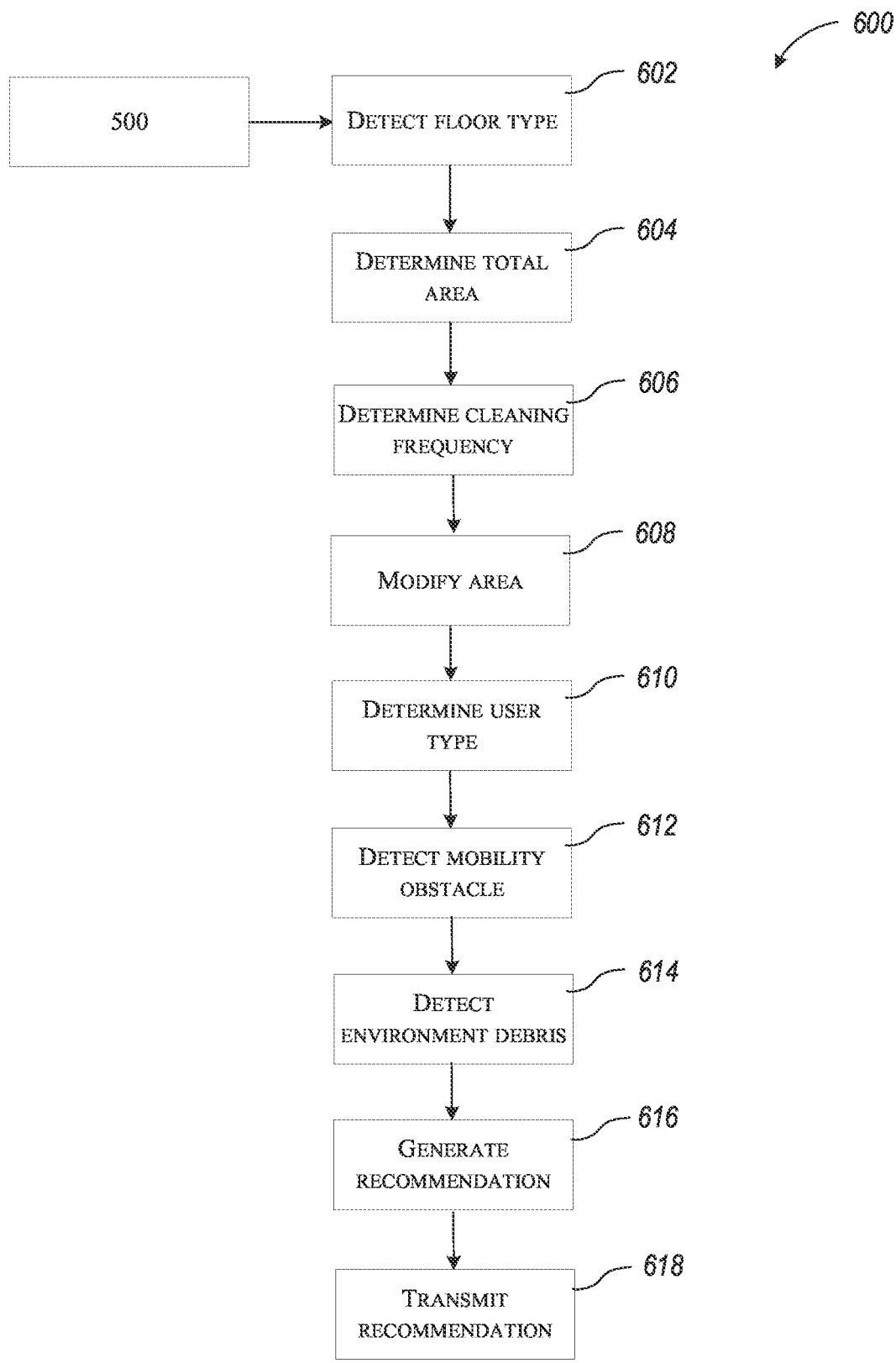
FIG. 6 illustrates a schematic view of a method.

FIG. 6 illustrates a schematic view of the method 600, in accordance with at least one example of this disclosure. The method 600 can be a method of generating a hardware recommendation to a user of an autonomous mobile cleaning robot. In some examples, the method 600 can follow any of the steps of the method 500. In other examples, the method 600 can stand as one or more independent steps.

At step 602 a flooring type within each portion of the environment accessed by the mobile autonomous cleaning robot can be detected. At step 604 a total area of one or more flooring types of the environment can be determined based at least in part on detection of the flooring types or a flooring condition, and the roller type recommendation can be generated based at least in part on the total area of the one or more flooring types of the environment.

For example, the controller 108 can use one or more sensor signals to detect or determine a flooring type of each of the surfaces 50a-50e within each room 42a-42e of the environment 40 accessed by the mobile autonomous cleaning robot 100. Then, the flooring type of each of the surfaces 50a-50e can be used to determine a percentage of each flooring type within the environment 40. The controller 108 can use the percentage or total area of each flooring type to determine which type of roller would be most effective or most efficient for the environment 40. Then, the recommendation can be transmitted to the mobile device 404 for display on a user interface of the mobile device 404.

At step 606 a cleaning frequency of the mobile autonomous cleaning robot in one or more portions of the environment can be determined. That is, a cleaning frequency of the mobile autonomous cleaning robot 100 in one or more rooms 42 of the environment 40 can be determined. The cleaning frequency can be a time-based frequency, as in the number of times the room or rooms are cleaned per unit time. For example, an environment can include a first portion of the environment having 100 square meters of hardwood surface and a second portion having 200 square meters of carpeted surface. If it is detected that the portions are cleaned at the same frequency, a roller optimized for carpet may be recommended. If it is determined that the hardwood portion is cleaned two or more times as often as the carpet portion, a hardwood optimized roller may be recommended.

The frequency can also account for a number of passes of the robot within the room or rooms. The controller 108 can use the cleaning frequency (optionally together with the flooring types, percentages, etc.) to determine a roller type recommendation. An example table T1 is shown below.

TABLE T1

| Flooring Type | Roller Recommendation |
| --- | --- |
| Hard | No bristles or vanes |
| Low-Pile | Vanes |
| Medium-Pile | Vanes or Bristles |
| High-Pile | Bristles |
| Combination | Vanes with multiple lengths |

A roller can also (or other hardware) can also be recommended based on a frequency of cleaning of the entire environment or a total cleaning time per unit time (which can be independent of room types). In one example, a first user can clean an environment of a first size twice per week and a second user can clean a second environment of a similar size twice per day. In this case, a roller can be recommended to the second user that is made of thicker or more rigid material to help withstand additional wear on the roller. In another example, a first user can clean an environment of a first size twice per week and a second user can clean a second environment of a second size twice per week. If the second environment is substantially larger than the first environment, a roller can be recommended that is made of thicker or more rigid material to help withstand additional wear on the roller.

At step 608 one or more of the total areas of the portions of the flooring types can be modified based at least in part on the cleaning frequency of the mobile autonomous cleaning robot in one or more portions of the environment. That is, the areas of the room 42 or groups of rooms of the environment 40 can be modified, based on the cleaning frequencies. For example, if the room 42d is cleaned more frequently than other rooms, the total area value can be increased, as can the value for the room 42d. These modified values can be used, at least in part, in producing or generating the roller recommendation.

Similarly, one or more of the total areas of the portions of the flooring types can be modified based at least in part on a keep-out zone of the environment. That is, the keep-out zone(s) in the environment 40 can be used to modify the total area value of the environment that is used in the determination of the roller recommendation.

At step 610 a user type can be determined based at least in part on input received from the user interface device. Various user types can be determined based on data received from the robot 100 and other robots of other environments. In some examples, the cloud computing system 406 can compare the data from various environments to determine user types. In some examples, the user type can be determined based at least in part on data received from a fleet of mobile autonomous cleaning robots.

User types can include frequent cleaners, infrequent cleaners, pet owners, and so on. The controller 108 (or the cloud computing system 406) can compare data received from the robot 100 to determine a user type for the environment 40. The user type can then be used to produce or generate a hardware recommendation that can be transmitted to the user device 404. For example, if the user type is determined to be a pet owner, the controller 108 can recommend a roller type conducive to extracting pet hair. The user type can be used to generate any hardware recommendation discussed herein.

At step 612, the controller, through the autonomous cleaning robot, can detect a mobility obstacle within the environment. For example, the controller 108 can use one or more of the sensors of the robot 100 to determine a presence of an obstacle, such as a large transition threshold between rooms, such as between rooms 42 of the environment 40. Such a mobility obstacle can be used by the controller 108 to generate any hardware recommendation discussed herein, such as a caster type.

At step 614 a sensor of the mobile autonomous cleaning robot can be used to detect debris within the environment. For example, a piezoelectric sensor mounted within, or upstream of, the bin 150 can be used to detect debris 75 from the environment 40 that passes through the suction pathway 148. The controller 108 can be in communication with such a sensor to determine a type and quantity of debris passing through the pathway 148 and into the bin 150 at any given time. The controller 108 can create logs and use the data to determine which room or rooms 42 of the environment collect more or less debris and of what type of debris each room 42 collects. The controller 108, for example, can use the data regarding the debris at step 616 to generate or create the roller type recommendation.

The roller recommendation can also be created or can be modified based on other robots in the environment (or fleet of robots within the environment 40). For example, if the environment 40 includes a mopping robot, a roller of the robot 100 can be optimized for carpet because the mopping robot can help to clean the hard surfaces of the environment 40, such as tile and hardwood.

At step 618, the roller type recommendation can be transmitted to a user interface device. For example, the roller type recommendation can be transmitted from the controller 108 to the mobile device 404 for display on a user interface of the mobile device 404. In other examples, other user device interfaces (such as a television, laptop computer, tablet computer, or desktop computer) can be used to display the recommendation.

In another example, a method of assisting user-configuration of hardware for a mobile autonomous cleaning robot can include detecting a flooring type of a portion of an environment. A size of the portion of the environment can be detected, and a total size of the environment can be determined. A hardware characteristic recommendation can be generated based at least in part on the flooring type, the size of the portion of the environment, and the total size of the environment. The hardware characteristic recommendation can be transmitted to a user interface device. In another example, the hardware can be one of a roller type, a caster type, a side brush type, a cage type, and a side brush rotational speed.

Figure 7A:
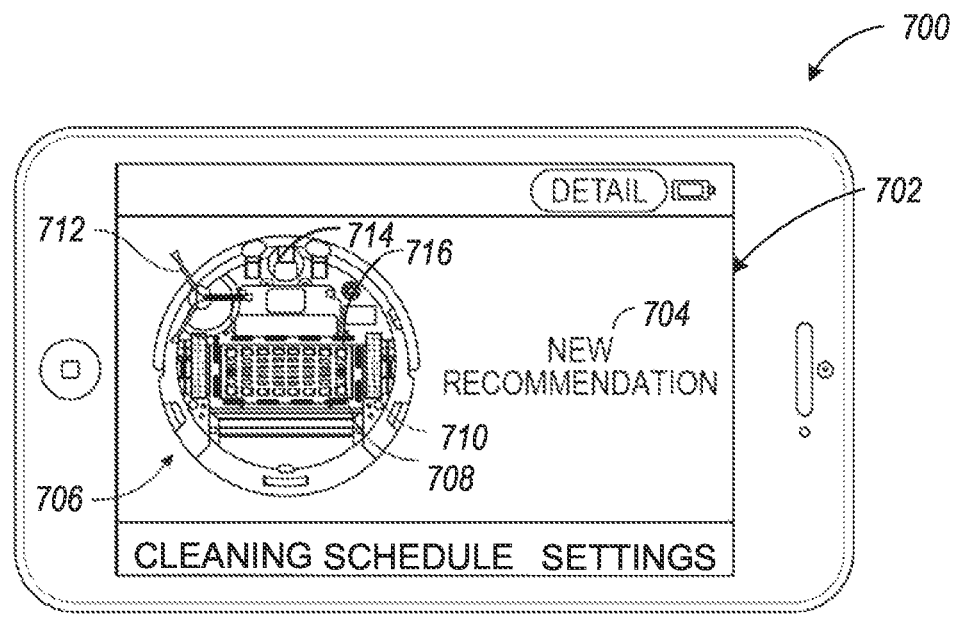
FIG. 7A illustrates a perspective view of a user device.
Figure 7B:
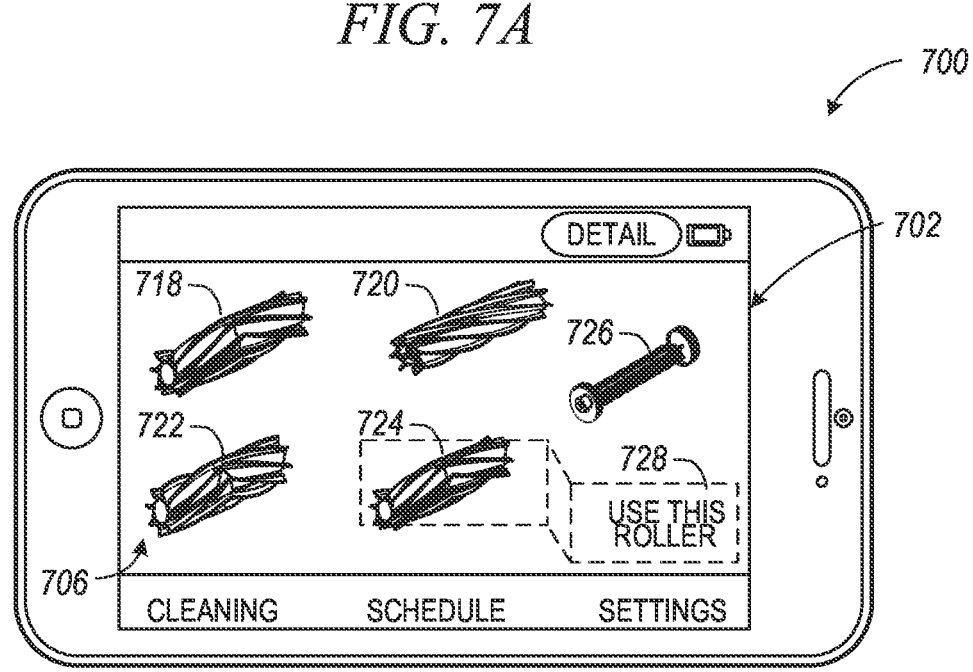
FIG. 7B illustrates a perspective view of a user device.

FIGS. 7A-7B are discussed below concurrently below and illustrate, by way of non-limiting example, a user interface of a smart phone 700, which can be an example of the mobile device 404.

As shown in FIG. 7A, a recommendation 704 of new hardware, such as to replace the rollers 118, can be presented on the display screen 702. The recommendation can be provided via one or more of a textual 704 user-interface element, and a graphical user-interface element 706. Additional user-interface elements can be deployed on the display screen 702 to indicate the component or components for which a recommendation is recommended. For example, element 708 can be a representation of a roller, which can be brightened or otherwise highlighted on the display screen 702 to indicate that the new recommendation is regarding the roller or rollers. Similarly: element 710 can be highlighted to indicate that the recommendation is regarding the drive wheel or wheels; element 712 can be highlighted to indicate that the recommendation is regarding the side brush; element 714 can be highlighted to indicate that the recommendation is regarding the caster; and, element 716 can be highlighted to indicate that the recommendation is regarding the cage. In other examples, other components can be highlighted or shown as FIG. 7B illustrates a perspective view of the user device 700 where the display screen can display several roller types on the graphical interface 706. For example, the element 718 can be a brush with a cavity for receiving removable bristles and a mobility feature, such as a nub. For example, the nub can be sufficiently stiff to allow the roller to engage the obstacle and lift the robot above the obstacle, thus enabling the robot to move over the obstacle.

The element 720 on the display 706 can be a roller including vanes extending along a length of the roller where the vanes can be of different lengths. Such a roller as shown in element 720 may be good for an environment with multiple types of carpeting. Element 722 can show a roller with vanes having a single vane length, which can be good for an environment with a single carpeting type. The element 724 can show a roller with vanes that extend tangentially to the roller surface. Such vanes can be less susceptible to wear and can be useful in environments where the robot 100 is more frequently used. The element 726 can show a roller having bristles, which can be more effecting in cleaning an environment having a larger percentage of carpeting.

The user device 700 can also be configured to show on the display 706 a selection 728, which can include a graphic indicator or text to indicate which roller should be installed. For example, the roller shown by selection 728 can be determined based on flooring type or any of the other methods of determining hardware for use in an environment discussed above.

In some examples, each of the rollers of the elements 718, 720, 722, 724, and 726 can be provided with the robot 100 at the time of sale. The robot 100 can then perform one or more cleaning missions and can provide a determination or recommendation as to which roller should be installed by a user for the most effective cleaning performance by the robot 100.

Figure 7C:
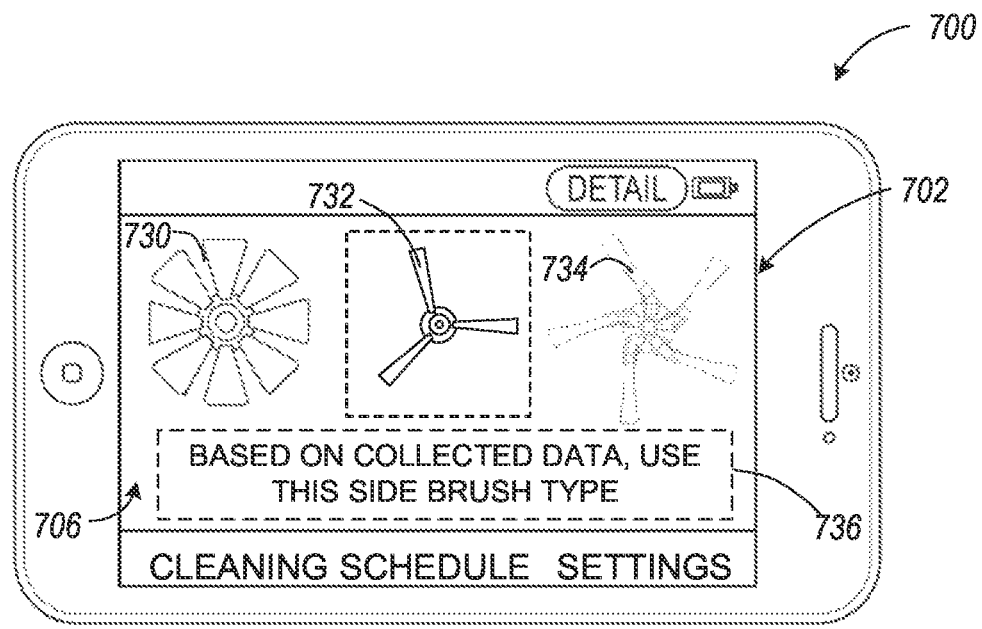
FIG. 7C illustrates a perspective view of a user device.

FIG. 7C illustrates a perspective view of a user device 700 where the display screen can display several side brush types on the graphical interface 706. For example, the interface 706 can show an element 730 that can be a first type of side brush that can include a higher number of brushes, which can help reduce debris scatter. Such a brush can be more effective for cleaning an environment with a larger percentage of hard surfaces. In some examples, the brush of element 730 can have rigid bristles, which can be more effective at cleaning in a carpeted environment.

Also, the interface 706 can show the element 732, which can be a side brush with fewer brushes or bristles. The element 734 can be a side brush with swept bristles, which can help reduce scatter and can help direct debris toward the extraction portions of the robot.

Figure 7D:
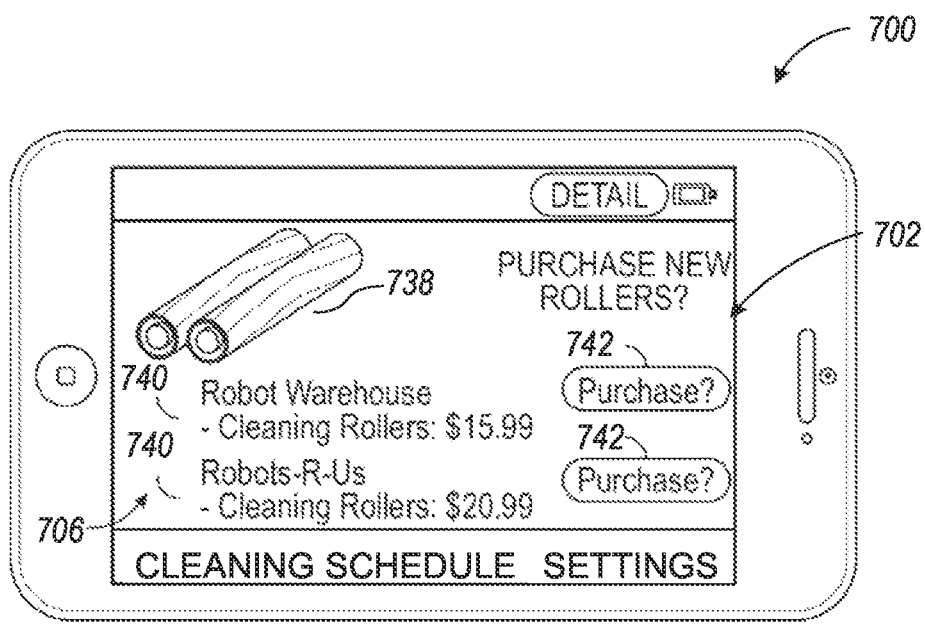
FIG. 7D illustrates a perspective view of a user device.

FIG. 7D illustrates the display screen 702 illustrating an additional display, for example following the display of FIG. 7A. The screen 702 of FIG. 7B can provide one or more selection options 742 that prompt the user to purchase new rollers that are recommended to replace the current set to improve performance of the robot 100. Further, in the illustrated example, textual user-interface elements 740 present one or more pricing options represented along with the name of a corresponding online vendor. Though the display screen 702 is shown in FIG. 7D as offering recommendations for rollers, the screen 702 can be configured to display a recommendation for any hardware component that is recommended for replacement or upgrade, such as the caster, side brush, cage, or the like.

Figure 8:
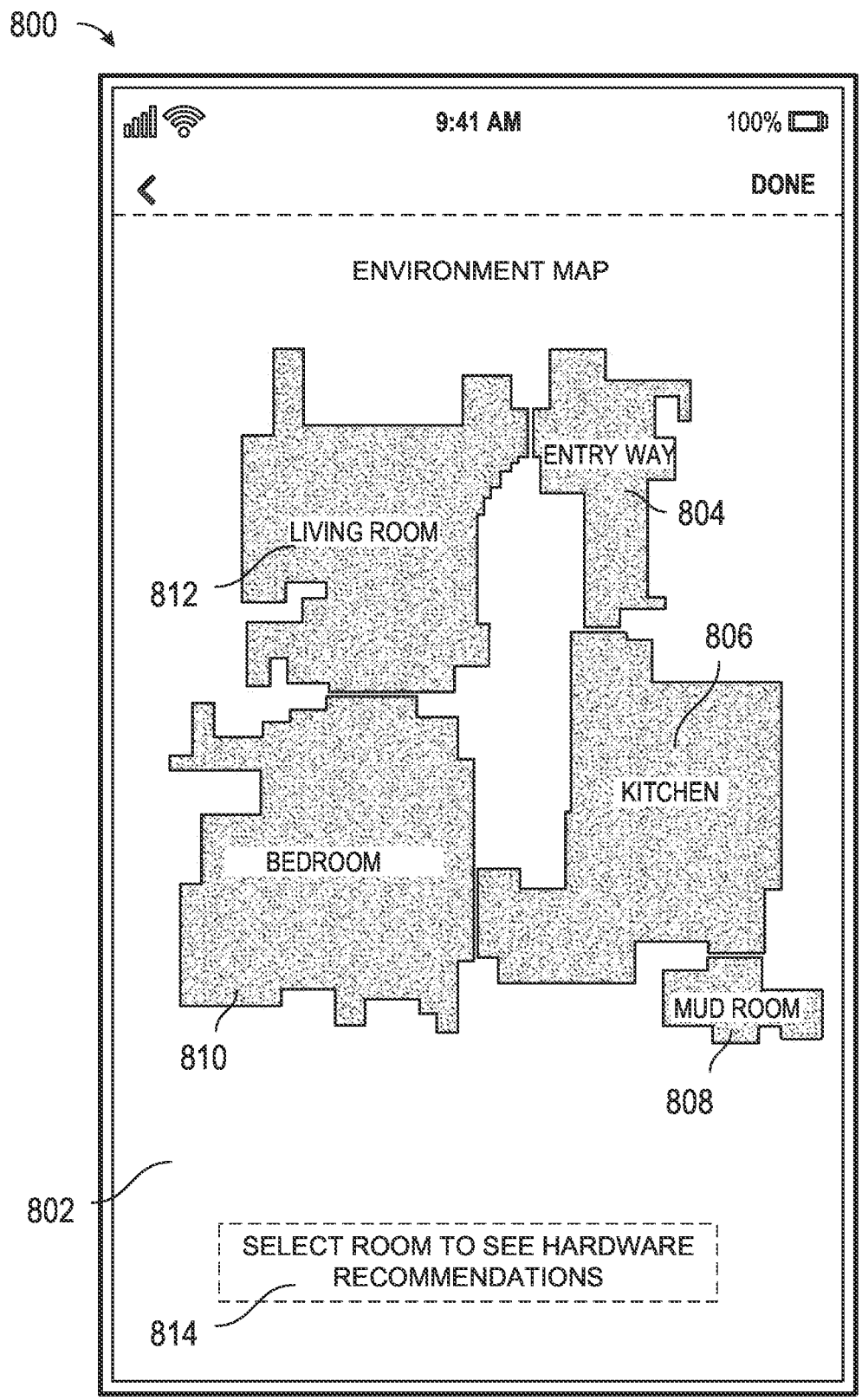
FIG. 8 illustrates a perspective view of a user device.

FIG. 8 illustrates a user device 800 which can include a graphical display 802. The display 802 can show an image of an environment map, such as a map produced by the robot 100 during one or more missions within the environment 40, where the environment includes an entry way 804, a kitchen 806, a mud room 808, a bedroom 810, and a living room 812. In operation, a user can select a room of the environment to view hardware recommendations, such as those discussed in FIGS. 7A-7D above.

For example, a user can be prompted at prompt 814 to select a room, such as by taping, pressing, or gesturing. For example, a user can select the bedroom 810, which can lead a user to a hardware recommendation screen for the bedroom 810. In such a screen, a user can be prompted to select, for example, rollers optimized for cleaning carpet. In some examples, a user can select multiple regions. For example, if a user cleans a kitchen, entry way, and living room regularly, a user can select the kitchen 806, entry way 804, and the living room 812 for receiving hardware recommendations made for those rooms of the environment. In other examples, specific regions (and not just rooms) can be selected. In any example, the system (such as the controller 100) can make hardware recommendations for one or more portions of the environment at the user's request via the user device 800.

Figure 9:
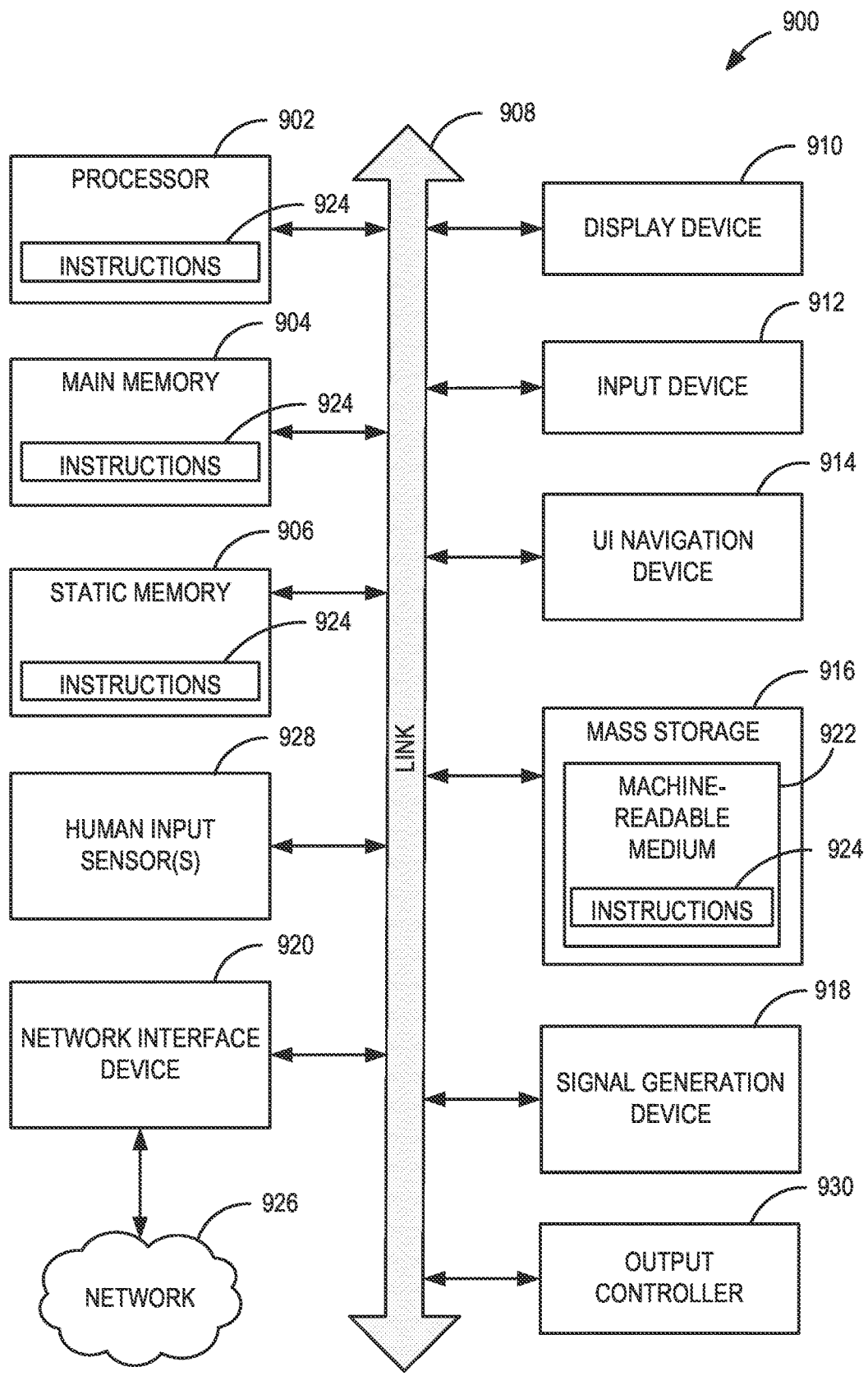
FIG. 9 illustrates a schematic view of a system.

FIG. 9 illustrates a schematic view of a system on which any one or more of the previous techniques may be performed or facilitated by the autonomous mobile cleaning robot 100 or the system connected thereto. For example, the system 900 can be included in the robot 100.

In alternative embodiments, the system 900 can operate as a standalone device or may be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a smartphone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 900 can include a processor 902 (e.g., a central processing unit (CPU), a graphics processing unit (GPU) or both), a main memory 904 and a static memory 906, which communicate with each other via a link 98 (e.g., an interlink, bus, etc.). The computer system 900 can also include a video display unit 9810, an alphanumeric input device 912 (e.g., a keyboard), and a user interface (UI) navigation device 914 (e.g., a mouse). In an example, the video display unit 910, input device 912 and UI navigation device 814 are a touch screen display. The computer system 900 can additionally include a storage device 916 (e.g., a drive unit), a signal generation device 918 (e.g., a speaker), and a network interface device 920 which can operably communicate with a communications network 926 using wired or wireless communications hardware. The computer system 900 can further include one or more human input sensors 928 configured to obtain input (including non-contact human input) in accordance with input recognition and detection techniques. The human input sensors 928 may include a camera, microphone, barcode reader, RFD reader, near field communications reader, or other sensor producing data for purposes of input. The computer system 800 can further include an output controller 930, such as a serial (e.g., universal serial bus (USB), parallel, or other wired or wireless (e.g., infrared (IR)) connection to communicate or control one or more peripheral devices (e.g., a printer, card reader, etc.).

The storage device 916 can include a machine-readable medium 922 on which is stored one or more sets of data structures or instructions 924 (e.g., software) embodying or utilized by any one or more of the methodologies or functions described herein. The instructions 924 can also reside, completely or at least partially, within the main memory 904, static memory 906, or within the processor 92 during execution thereof by the computer system 900, with the main memory 9804, static memory 906, and the processor 902 also constituting machine-readable media.

While the machine-readable medium 922 is illustrated in an example embodiment to be a single medium, the term "machine-readable medium" can include a single medium or multiple media (e.g., a centralized or distributed database, or associated caches and servers) that store the one or more instructions 924. The term "machine-readable medium" shall also be taken to include any tangible medium (e.g., a non-transitory medium) that is capable of storing, encoding or carrying instructions for execution by the computer system 900 and that cause the computer system 900 to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 924 can further be transmitted or received over a communications network 926 using a transmission medium via the network interface device 920 utilizing any one of a number of well-known transfer protocols (e.g., frame relay, internet protocol (IP), transmission control protocol (TCP), user datagram protocol (UDP), hypertext transfer protocol (HTTP)). Examples of communication networks include a local area network (LAN), wide area network (WAN), the Internet, mobile telephone networks, Plain Old Telephone (POTS) networks, and wireless data networks 3G, and 4G LTE/LTE-A or 5G networks). The term "transmission medium" shall be taken to include any intangible medium that is capable of storing, encoding, or carrying instructions for execution by the computing system 900, and includes digital or analog communications signals or other intangible medium to facilitate communication of such software.

As an additional example, computing embodiments described herein may be implemented in one or a combination of hardware, firmware, and software. Embodiments may also be implemented as instructions stored on a computer-readable storage device, which can be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. Component or modules can be implemented in any combination of hardware circuits, programmable hardware devices, other discrete components. Components or modules can also be implemented in software for execution by various types of processors. An identified component or module of executable code can, for instance, comprise one or more physical or logical blocks of computer instructions, which may, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module. Indeed, a component or module of executable code may be a single instruction, or many instructions, and may even be distributed over several different code segments, among different programs, and across several memory devices.

Similarly, operational data can be identified and illustrated herein within components or modules and may be embodied in any suitable form and organized within any suitable type of data structure. The operational data can be collected as a single data set or may be distributed over different locations including over different storage devices, and may exist, at least partially, merely as electronic signals on a system or network. The components or modules can be passive or active, including agents operable to perform desired functions.

The following, non-limiting examples, detail certain aspects of the present subject matter to solve the challenges and provide the benefits discussed herein, among others.

Example 1 can be a method of assisting user-configuration of hardware for a mobile autonomous cleaning robot, the method comprising: detecting a flooring type of a portion of an environment; detecting a size of the portion of the environment; determining a total size of the environment; generating a roller type recommendation based at least in part on the flooring type, the size of the portion of the environment, and the total size of the environment; and transmitting the roller type recommendation to a user interface device.

In Example 2, the subject matter of Example 1 optionally includes detecting a flooring type within each portion of the environment accessed by the mobile autonomous cleaning robot; and determining a total area of one or more flooring types of the environment based at least in part on detection of the flooring types; and generating the roller type recommendation based at least in part on the total area of the one or more flooring types of the environment.

In Example 3, the subject matter of Example 2 optionally includes determining a cleaning frequency of the mobile autonomous cleaning robot in one or more portions of the environment; and generating the roller type recommendation based at least in part on the cleaning frequency.

In Example 4, the subject matter of Example 3 optionally includes modifying one or more of the total areas of the portions of the flooring types based at least in part on the cleaning frequency of the mobile autonomous cleaning robot in one or more portions of the environment; and generating the roller type recommendation based at least in part on the modified total areas of the flooring types.

In Example 5, the subject matter of any one or more of Examples 3-4 optionally include modifying one or more of the total areas of the portions of the flooring types based at least in part on a keep-out zone of the environment; and generating the roller type recommendation based at least in part on the modified total areas of the flooring types.

In Example 6, the subject matter of any one or more of Examples 1-5 optionally include determining a user type based at least in part on input received from the user interface device; and generating the roller type recommendation based at least in part on the user type.

In Example 7, the subject matter of Example 6 optionally includes determining the user type based at least in part on data received from a fleet of mobile autonomous cleaning robots.

In Example 8, the subject matter of any one or more of Examples 1-7 optionally include detecting, using the mobile autonomous cleaning robot, a mobility obstacle within the environment; and generating the roller type recommendation based at least in part on the mobility obstacle.

In Example 9, the subject matter of any one or more of Examples 1-8 optionally include detecting, using a sensor of the mobile autonomous cleaning robot, debris within the environment; and generating the roller type recommendation based at least in part on the detected debris.

In Example 10, the subject matter of Example 9 optionally includes detecting, using a sensor of the mobile autonomous cleaning robot, a type of the debris within the environment; and generating the roller type recommendation based at least in part on the type of detected debris.

Example 11 can be a method of assisting user-configuration of hardware for a mobile autonomous cleaning robot, the method comprising: creating a map of an environment using a mobile autonomous cleaning robot, the map defined at least partially by one or more rooms; detecting a flooring type within one or more rooms of the environment; determining a total environment size of the environment; determining a room size for one or more room of the environment; producing a flooring type indication based at least in part on the total environment size, the room size for one or more room, and the flooring type within one or more room; generating a caster type recommendation based at least in part on the flooring type indication; and transmitting the caster type recommendation to a user interface device.

In Example 12, the subject matter of Example 11 optionally includes determining a caster size based at least in part on the flooring type indication.

In Example 13, the subject matter of Example 12 optionally includes determining a caster compliance based at least in part on the flooring type indication.

In Example 14, the subject matter of any one or more of Examples 11-13 optionally include detecting, using the mobile autonomous cleaning robot, a mobility obstacle within the environment; and generating the caster type recommendation based at least in part on the mobility obstacle.

Example 15 can be a method of assisting user-configuration of hardware for a mobile autonomous cleaning robot, the method comprising: creating a map of an environment using a mobile autonomous cleaning robot, the map defined at least partially by one or more rooms; detecting a flooring type within one or more room of the environment; determining a total environment size of the environment; determining a room size for one or more room of the environment; producing a flooring type indication based at least in part on the total environment size, the room size for one or more room, and the flooring type within one or more room; generating a side brush type recommendation based at least in part on the flooring type indication; and transmitting the side brush type recommendation to a user interface device.

In Example 16, the subject matter of Example 15 optionally includes determining an optimal side brush length based at least in part on the flooring type indication.

In Example 17, the subject matter of Example 16 optionally includes determining an optimal side brush rotational speed on the flooring type indication; and adjusting the rotational speed of the side brush.

Example 18 can be a method of assisting user-configuration of hardware for a mobile autonomous cleaning robot, the method comprising: creating a map of an environment using a mobile autonomous cleaning robot, the map defined at least partially by one or more rooms; detecting a flooring type within one or more room of the environment; determining a total environment size of the environment; determining a room size for one or more room of the environment; producing a flooring type indication based at least in part on the total environment size, the room size for one or more room, and the flooring type within one or more room; generating a cage type recommendation based at least in part on the flooring type; and transmitting the cage type recommendation to a user interface device.

Example 19 can be a method of assisting user-configuration of hardware for a mobile autonomous cleaning robot, the method comprising: detecting a flooring type of a portion of an environment; detecting a size of the portion of the environment; determining a total size of the environment; generating a hardware characteristic recommendation based at least in part on the flooring type, the size of the portion of the environment, and the total size of the environment; and transmitting the hardware characteristic recommendation to a user interface device.

In Example 20, the subject matter of any one or more of Examples 12-19 optionally include wherein the hardware is one of a roller type, a caster type, a side brush type, a cage type, and a side brush rotational speed.

Example 21 can be a method of assisting user-configuration of hardware for a mobile autonomous cleaning robot, the method comprising: creating a map of an environment using a mobile autonomous cleaning robot, the map defined at least partially by one or more rooms; detecting a flooring type within one or more individual ones of the rooms; determining a total environment size of the environment; determining a room size for one or more individual ones of the rooms of the environment; producing a flooring type indication based at least in part on the total environment size, the room size for individual ones of the rooms, and the flooring type within one or more individual ones of the rooms; generating a roller type recommendation based at least in part at least in part on the flooring type indication; and transmitting the roller type recommendation to a user interface device.

In Example 22, the subject matter of Example 21 optionally includes determining a cleaning frequency of the mobile autonomous cleaning robot in individual ones of the rooms of the environment; and generating the roller type recommendation based at least in part on the cleaning frequency of individual ones of the rooms.

In Example 23, the subject matter of Example 22 optionally includes updating the flooring type indication based at least in part on the cleaning frequency of the mobile autonomous cleaning robot in one or more room of the environment.

In Example 24, the subject matter of Example 23 optionally includes generating the roller type recommendation based at least in part on the updated flooring type indication.

In Example 25, the subject matter of Example 24 optionally includes updating the flooring type indication based at least in part on a keep-out zone of the map of the environment; and generating the roller type recommendation based at least in part on the updated flooring type indication.

In Example 26, the subject matter of any one or more of Examples 21-25 optionally include determining a user type based at least in part on input received from the user interface device; and generating the roller type recommendation based at least in part on the user type.

In Example 27, the subject matter of Example 26 optionally includes determining the user type based on data received from a fleet of mobile autonomous cleaning robots.

In Example 28, the subject matter of any one or more of Examples 21-27 optionally include detecting, using the mobile autonomous cleaning robot, a mobility obstacle within the environment; and generating the roller type recommendation based at least in part on the mobility obstacle.

In Example 29, the subject matter of any one or more of Examples 21-28 optionally include detecting, using a sensor of the mobile autonomous cleaning robot, debris within a room of the environment; and generating the roller type recommendation based at least in part on the detected debris.

In Example 30, the subject matter of Example 29 optionally includes detecting, using a sensor of the mobile autonomous cleaning robot, a type of the debris within the room of the environment; and generating the roller type recommendation based at least in part on the type of detected debris.

Example 31 is a method of assisting user-configuration of hardware for a mobile autonomous cleaning robot, the method comprising: detecting a flooring type of a portion of an environment; detecting a size of the portion of the environment; determining a total size of the environment; generating a roller type recommendation based at least in part on the flooring type, the size of the portion of the environment, and the total size of the environment; and transmitting the roller type recommendation to a user interface device.

In Example 32, the subject matter of Example 31 optionally includes detecting a flooring type within each portion of the environment accessed by the mobile autonomous cleaning robot; and determining a total area of one or more flooring types of the environment based at least in part on detection of the flooring types; and generating the roller type recommendation based at least in part on the total area of the one or more flooring types of the environment.

In Example 33, the subject matter of Example 32 optionally includes determining a cleaning frequency of the mobile autonomous cleaning robot in one or more portions of the environment; and generating the roller type recommendation based at least in part on the cleaning frequency.

In Example 34, the subject matter of Example 33 optionally includes modifying one or more of the total areas of the portions of the flooring types based at least in part on the cleaning frequency of the mobile autonomous cleaning robot in one or more portions of the environment; and generating the roller type recommendation based at least in part on the modified total areas of the flooring types.

In Example 35, the subject matter of any one or more of Examples 33-34 optionally include modifying one or more of the total areas of the portions of the flooring types based at least in part on a keep-out zone or a focused cleaning zone of the environment; and generating the roller type recommendation based at least in part on the modified total areas of the flooring types.

In Example 36, the subject matter of any one or more of Examples 31-35 optionally include determining a user type based at least in part on input received from the user interface device; and generating the roller type recommendation based at least in part on the user type.

In Example 37, the subject matter of Example 36 optionally includes determining the user type based at least in part on data received from a fleet of mobile autonomous cleaning robots.

In Example 38, the subject matter of any one or more of Examples 31-37 optionally include detecting, using the mobile autonomous cleaning robot, a mobility obstacle within the environment; and generating the roller type recommendation based at least in part on the mobility obstacle.

In Example 39, the subject matter of any one or more of Examples 31-38 optionally include detecting, using a sensor of the mobile autonomous cleaning robot, debris within the environment; and generating the roller type recommendation based at least in part on the detected debris.

In Example 40, the subject matter of Example 39 optionally includes detecting, using a sensor of the mobile autonomous cleaning robot, a type of the debris within the environment; and generating the roller type recommendation based at least in part on the type of detected debris.

Example 41 is a method of assisting user-configuration of hardware for a mobile autonomous cleaning robot, the method comprising: creating a map of an environment using a mobile autonomous cleaning robot, the map defined at least partially by one or more rooms; detecting, using the mobile autonomous cleaning robot, a mobility obstacle within the environment; and generating a mobility feature recommendation based at least in part on the mobility obstacle; and transmitting the mobility feature type recommendation to a user interface device.

In Example 42, the subject matter of Example 41 optionally includes determining a mobility feature size based at least in part on the mobility obstacle.

In Example 43, the subject matter of Example 42 optionally includes determining a mobility feature compliance based at least in part on the mobility obstacle.

In Example 44, the subject matter of any one or more of Examples 41-43 optionally include wherein the mobility feature is a roller including a nub.

In Example 45, the subject matter of any one or more of Examples 41-44 optionally include wherein the mobility feature is a caster.

In Example 46, the subject matter of any one or more of Examples 41-45 optionally include wherein the mobility obstacle is a threshold or transition between flooring types.

Example 47 is a method of assisting user-configuration of hardware for a mobile autonomous cleaning robot, the method comprising: detecting a size of the portion of the environment; determining a total size of the environment; detecting, using a sensor of the mobile autonomous cleaning robot, a size of debris within the portion of the environment generating a hardware characteristic recommendation based at least in part on the flooring type, the size of the portion of the environment, and the size of the debris within the portion of the environment; and transmitting the hardware characteristic recommendation to a user interface device.

In Example 48, the subject matter of Example 47 optionally includes wherein the hardware characteristic recommendation is a side brush type recommendation based at least in part on the flooring type indication.

In Example 49, the subject matter of any one or more of Examples 46-48 optionally include determining an optimal side brush length based at least in part on the flooring type indication.

In Example 50, the subject matter of any one or more of Examples 47-49 optionally include wherein the hardware characteristic recommendation is a roller having relatively large vanes when large debris is detected.

In Example 51, the subject matter of any one or more of Examples 47-50 optionally include wherein the hardware characteristic recommendation is a roller having relatively small vanes when small debris is detected.

Example 52 is a method of assisting user-configuration of hardware for a mobile autonomous cleaning robot, the method comprising: detecting a size of a portion of the environment; determining a total size of the environment; detecting, using a sensor of the mobile autonomous cleaning robot, debris within the environment; generating the roller type recommendation based at least in part on the detected debris, the size of the portion of the environment, and the total size of the environment; and transmitting the roller type recommendation to a user interface device.

In Example 53, the apparatuses or method of any one or any combination of Examples 1-52 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method of assisting user-configuration of hardware for a mobile cleaning robot, the method comprising:
   detecting a flooring type of a portion of an environment;
   detecting a size of the portion of the environment;
   determining a total size of the environment;
   generating a side brush type recommendation based at least in part on the flooring type, the size of the portion of the environment, and the total size of the environment; and
   transmitting the side brush type recommendation to a user interface device.

2. The method of claim 1, further comprising:
   detecting a flooring type within one or more individual portions of the environment accessed by the mobile cleaning robot;
   determining a total area of one or more flooring types of the environment based at least in part on detection of the flooring type of the one or more individual portions of the environment; and
   generating the side brush type recommendation based at least in part on the total area of the one or more flooring types of the environment.

3. The method of claim 2, further comprising:
   determining a cleaning frequency of the mobile cleaning robot in the one or more individual portions of the environment; and
   generating the side brush type recommendation based at least in part on the cleaning frequency.

4. The method of claim 3, further comprising:
   modifying one or more of the total area of the one or more individual portions of the flooring types based at least in part on the cleaning frequency of the mobile cleaning robot in the one or more individual portions of the environment; and
   generating the side brush type recommendation based at least in part on the modified total areas of the flooring types.

5. The method of claim 3, further comprising:
   modifying one or more of the total areas of the one or more individual portions of the flooring types based at least in part on at least one of a keep-out zone or a focused cleaning zone of the environment; and
   generating the side brush type recommendation based at least in part on the modified total areas of the flooring types.

6. The method of claim 1, further comprising:
   determining a user type based at least in part on input received from the user interface device; and
   generating the side brush type recommendation based at least in part on the user type.

7. The method of claim 6, further comprising:
   determining the user type based at least in part on data received from a fleet of mobile cleaning robots.

8. The method of claim 1, further comprising:
   detecting, using a sensor of the mobile cleaning robot, debris within the environment; and
   generating the side brush type recommendation based at least in part on the detected debris.

9. The method of claim 8, further comprising:
   detecting, using the sensor of the mobile cleaning robot, a type of the debris within the environment; and
   generating the side brush type recommendation based at least in part on the type of detected debris.

10. A method of assisting user-configuration of hardware for a mobile cleaning robot, the method comprising:
    detecting a size of a portion of an environment;
    determining a total size of the environment;
    detecting, using a sensor of the mobile cleaning robot, a type of debris within the portion of the environment;
    generating a side brush length recommendation based at least in part on the size of the portion of the environment, the total size of the environment, and the type of the debris within the portion of the environment; and
    transmitting the side brush length recommendation to a user interface device.

11. The method of claim 10, further comprising:
    detecting a flooring type in the portion of the environment, wherein the side brush length recommendation is based at least in part on the detected flooring type.

12. The method of claim 11, further comprising:
    determining a cleaning frequency of the mobile cleaning robot in one or more individual portions of the environment; and
    generating the side brush length recommendation based at least in part on the cleaning frequency.

13. The method of claim 10, further comprising:
    determining a user type based at least in part on input received from the user interface device; and
    generating the side brush length recommendation based at least in part on the user type.

14. The method of claim 13, further comprising:
    determining the user type based at least in part on data received from a fleet of mobile cleaning robots.

15. A method of assisting user-configuration of hardware for a mobile cleaning robot, the method comprising:
    detecting a size of a portion of an environment;
    determining a total size of the environment;
    detecting, using a sensor of the mobile cleaning robot, debris within the portion of the environment;
    generating a cage recommendation based at least in part on the size of the portion of the environment, the total size of the environment, and the detected debris within the portion of the environment; and transmitting the cage recommendation to a user interface device.

16. The method of claim 15, further comprising:

detecting, using the sensor of the mobile cleaning robot, a type of the debris within the environment; and generating the cage recommendation based at least in part on the type of detected debris.

17. The method of claim 16, further comprising:

detecting a flooring type in the portion of the environment, wherein the cage recommendation is based at least in part on the detected flooring type.

18. The method of claim 17, further comprising:

determining a cleaning frequency of the mobile cleaning robot in one or more individual portions of the environment; and generating the cage recommendation based at least in part on the cleaning frequency.

19. The method of claim 15, further comprising:

determining a user type based at least in part on input received from the user interface device; and generating the cage recommendation based at least in part on the user type.

20. The method of claim 19, further comprising:

determining the user type based at least in part on data received from a fleet of mobile cleaning robots.

21. A non-transitory machine-readable medium including instructions, for assisting user-configuration of hardware for a mobile cleaning robot, which when executed by a machine, cause the machine to:

detect a flooring type of a portion of an environment;

detect a size of the portion of the environment;

determine a total size of the environment;

generate a side brush type recommendation based at least in part on the flooring type, the size of the portion of the environment, and the total size of the environment; and transmit the side brush type recommendation to a user interface device.

22. The non-transitory machine-readable medium of claim 21, the instructions to further cause the machine to:

detect a flooring type within one or more individual portions of the environment accessed by the mobile cleaning robot;

determine a total area of one or more flooring types of the environment based at least in part on detection of the flooring types; and generate the side brush type recommendation based at least in part on the total area of the one or more flooring types of the environment.

23. The non-transitory machine-readable medium of claim 22, the instructions to further cause the machine to:

determine a cleaning frequency of the mobile cleaning robot in the one or more individual portions of the environment; and generate the side brush type recommendation based at least in part on the cleaning frequency.

24. The non-transitory machine-readable medium of claim 23, the instructions to further cause the machine to:

modify one or more of the total areas of the one or more individual portions of the flooring types based at least in part on the cleaning frequency of the mobile cleaning robot in one or more individual portions of the environment; and generate the side brush type recommendation based at least in part on the modified total areas of the flooring types.

25. The non-transitory machine-readable medium of claim 23, the instructions to further cause the machine to:

modify one or more of the total areas of the one or more individual portions of the flooring types based at least in part on at least one of a keep-out zone or a focused cleaning zone of the environment; and generate the side brush type recommendation based at least in part on the modified total areas of the flooring types.

26. The non-transitory machine-readable medium of claim 21, the instructions to further cause the machine to:

determine a user type based at least in part on input received from the user interface device; and generating the side brush type recommendation based at least in part on the user type.

27. The non-transitory machine-readable medium of claim 26, the instructions to further cause the machine to:

determine the user type based at least in part on data received from a fleet of mobile cleaning robots.

28. The non-transitory machine-readable medium of claim 21, the instructions to further cause the machine to:

detect, using a sensor of the mobile cleaning robot, debris within the environment; and generate the side brush type recommendation based at least in part on the detected debris.

* * * * *